United States Patent
Ohm et al.

(10) Patent No.: US 9,744,677 B2
(45) Date of Patent: Aug. 29, 2017

(54) ROBOTIC FINGERS AND END EFFECTORS INCLUDING SAME

(71) Applicant: iRobot Corporation, Bedford, MA (US)

(72) Inventors: Timothy R. Ohm, Grover Beach, CA (US); Mark R. Claffee, Methuen, MA (US); Erik Amaral, Lexington, MA (US); Steven V. Shamlian, Watertown, MA (US); Annan M. Mozeika, Andover, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/933,443

(22) Filed: Nov. 5, 2015

(65) Prior Publication Data

US 2017/0129110 A1    May 11, 2017

(51) Int. Cl.
*B25J 15/10*    (2006.01)
*B25J 15/12*    (2006.01)
(Continued)

(52) U.S. Cl.
CPC ............. *B25J 15/08* (2013.01); *B25J 13/084* (2013.01); *B25J 15/0009* (2013.01)

(58) Field of Classification Search
CPC .................................. B25J 25/10; B25J 15/12
(Continued)

(56) References Cited

U.S. PATENT DOCUMENTS 2,540,375 A * 2/1951 Motis .................... A61F 2/588
                                                    623/61
2,554,452 A * 5/1951 Bright ................ B60R 13/0206
                                                    16/16
(Continued)

FOREIGN PATENT DOCUMENTS

CN    102873689 A    1/2013
JP    2001-277174 A   10/2001
(Continued)

OTHER PUBLICATIONS

Grifantini, Kristina, "A Simpler, Gentler Robotic Grip", MIT Technology Review, Retrieved from: http://www.technologyreview.com/news/415477/a-simpler-gentler-robotic-grip, Retrieved on: Sep. 28, 2009, 4 pages.

(Continued)

*Primary Examiner* — Paul T Chin
(74) *Attorney, Agent, or Firm* — Myers Bigel, P.A.

(57) ABSTRACT

A robotic end effector includes a finger and at least one actuator. The finger extends from a proximal end to a distal end along a finger axis. The finger includes a first phalanx proximate the proximal end, a second phalanx proximate the distal end, and a knuckle joint including at least one vertebra interposed between and separating the first and second phalanxes. The knuckle joint is configured to permit the second phalanx to pivot relative to the first phalanx about a pivot axis transverse to the finger axis. Each vertebra has an axial thickness extending along the finger axis and a lateral width extending perpendicular to its axial thickness, and its lateral width is greater than its axial thickness. The at least one actuator is operable to move the second phalanx relative to the first phalanx about the pivot axis.

22 Claims, 17 Drawing Sheets

(51) Int. Cl.
*B25J 15/08* (2006.01)
*B25J 13/08* (2006.01)
*B25J 15/00* (2006.01)

(58) Field of Classification Search
USPC ....... 901/30, 33, 36, 39; 294/86.4, 106, 111, 294/213, 907
See application file for complete search history.

(56) References Cited

U.S. PATENT DOCUMENTS

| | | | |
|---|---|---|---|
| 2,847,678 A * | 8/1958 | Opuszenski | A61F 2/58 623/64 |
| 3,370,213 A | 2/1968 | Rose | |
| 3,694,021 A | 9/1972 | Mullen | |
| 3,927,424 A | 12/1975 | Itoh | |
| 4,094,016 A * | 6/1978 | Eroyan | A61F 2/583 623/24 |
| 4,246,661 A | 1/1981 | Pinson | |
| 4,351,553 A | 9/1982 | Rovetta et al. | |
| 4,364,593 A | 12/1982 | Maeda | |
| 4,600,357 A | 7/1986 | Coules | |
| 4,834,443 A | 5/1989 | Crowder et al. | |
| 4,921,293 A * | 5/1990 | Ruoff | A61F 2/583 294/106 |
| 4,955,918 A | 9/1990 | Lee | |
| 4,957,320 A | 9/1990 | Ulrich | |
| 4,980,626 A * | 12/1990 | Hess | B25J 9/1005 250/559.33 |
| 4,984,951 A | 1/1991 | Jameson | |
| 4,986,723 A * | 1/1991 | Maeda | B25J 9/06 294/111 |
| 5,080,681 A | 1/1992 | Erb | |
| 5,108,140 A | 4/1992 | Bartholet | |
| 5,200,679 A | 4/1993 | Graham | |
| 5,280,981 A | 1/1994 | Schulz | |
| 5,318,331 A * | 6/1994 | Tozuka | B25J 15/0206 294/106 |
| 5,447,403 A | 9/1995 | Engler, Jr. | |
| 5,501,498 A | 3/1996 | Ulrich | |
| 5,570,920 A | 11/1996 | Crisman et al. | |
| 5,647,723 A * | 7/1997 | Rush | B25J 15/0009 294/111 |
| 5,762,390 A | 6/1998 | Gosselin et al. | |
| 5,884,951 A | 3/1999 | Long et al. | |
| 5,947,539 A | 9/1999 | Long et al. | |
| 6,247,738 B1 * | 6/2001 | Winkel | B25J 15/0009 294/111 |
| 6,435,582 B1 | 8/2002 | DaSilva et al. | |
| 6,517,132 B2 | 2/2003 | Matsuda et al. | |
| 6,557,432 B2 | 5/2003 | Rosheim | |
| 6,918,622 B2 | 7/2005 | Kim et al. | |
| 7,168,748 B2 | 1/2007 | Townsend et al. | |
| 7,258,379 B2 | 8/2007 | Ono et al. | |
| 7,296,835 B2 | 11/2007 | Blackwell et al. | |
| 7,407,208 B2 | 8/2008 | Tadano | |
| 7,549,688 B2 | 6/2009 | Hayakawa et al. | |
| 7,654,595 B2 | 2/2010 | Yokoyama et al. | |
| 8,195,334 B2 * | 6/2012 | Fukushima | B25J 13/085 700/245 |
| 8,231,158 B2 | 7/2012 | Dollar et al. | |
| 8,442,678 B2 | 5/2013 | Ichikawa et al. | |
| 8,483,880 B2 | 7/2013 | de la Rosa Tames et al. | |
| 8,549,952 B2 | 10/2013 | Matsukuma et al. | |
| 8,585,111 B2 | 11/2013 | Nammoto et al. | |
| 8,641,115 B2 | 2/2014 | Kim et al. | |
| 8,660,695 B2 | 2/2014 | de la Rosa Tames et al. | |
| 8,827,337 B2 * | 9/2014 | Murata | B25J 15/0009 294/106 |
| 8,833,827 B2 | 9/2014 | Ciocarlie et al. | |
| 8,936,289 B1 | 1/2015 | Kozlowski et al. | |
| 8,936,290 B1 | 1/2015 | Salisbury et al. | |
| 9,004,553 B2 | 4/2015 | Hickey et al. | |
| 9,039,057 B2 * | 5/2015 | Schvalb | A61F 2/586 294/106 |
| 2001/0028174 A1 | 10/2001 | Matsuda et al. | |
| 2005/0040663 A1 | 2/2005 | Kameda et al. | |
| 2005/0121929 A1 | 6/2005 | Greenhill et al. | |
| 2005/0218679 A1 | 10/2005 | Yokoyama et al. | |
| 2006/0028041 A1 | 2/2006 | Ono et al. | |
| 2006/0131908 A1 | 6/2006 | Tadano | |
| 2009/0302626 A1 | 12/2009 | Dollar et al. | |
| 2009/0317223 A1 | 12/2009 | Schoenfeld et al. | |
| 2010/0010670 A1 | 1/2010 | Matsukuma et al. | |
| 2010/0139418 A1 | 6/2010 | Loeb et al. | |
| 2010/0139437 A1 | 6/2010 | Ichikawa et al. | |
| 2011/0040408 A1 | 2/2011 | de la Rosa Tames et al. | |
| 2012/0205933 A1 | 8/2012 | Dai | |
| 2013/0106128 A1 | 5/2013 | Yamasaki et al. | |
| 2013/0119689 A1 | 5/2013 | Nishiwaki | |
| 2013/0152724 A1 | 6/2013 | Mozeika et al. | |
| 2013/0245823 A1 | 9/2013 | Kimura et al. | |
| 2014/0035306 A1 | 2/2014 | Garcia et al. | |
| 2014/0132020 A1 | 5/2014 | Claffee et al. | |
| 2014/0284951 A1 | 9/2014 | Miyazawa | |

FOREIGN PATENT DOCUMENTS

| | | |
|---|---|---|
| JP | 2010-036328 A | 2/2010 |
| KR | 2011-0005146 A | 1/2011 |
| WO | WO 00/69375 A1 | 11/2000 |

OTHER PUBLICATIONS

Willow Garage "2G 'Velo' Gripper", Retrieved from: http://www.willowgarage.com/velo2g, Retrieved on: Aug. 8, 2014; 2 pages.
Notification of Transmittal of the International Search Report and the Written Opinion of the International Searching Authority, or the Declaration, in corresponding PCT Application No. PCT/US2016/059818 mailed Apr. 4, 2017 (12 pages).

* cited by examiner

ROBOTIC FINGERS AND END EFFECTORS INCLUDING SAME

FIELD

The present invention relates to robots and, more particularly, to robotic fingers and end effectors.

BACKGROUND OF THE INVENTION

Robotic end effectors or graspers are commonly used to manipulate and/or grasp objects in a selected environment. The environment may be structured or unstructured. Such robotic end effectors or graspers may be provided on robotic arms. Robotic end effectors may be provided with fingers adapted to perform a range of actions and manipulations.

SUMMARY OF THE INVENTION

According to embodiments of the invention, a robotic end effector includes a finger and at least one actuator. The finger extends from a proximal end to a distal end along a finger axis. The finger includes a first phalanx proximate the proximal end, a second phalanx proximate the distal end, and a knuckle joint including at least one vertebra interposed between and separating the first and second phalanxes. The knuckle joint is configured to permit the second phalanx to pivot relative to the first phalanx about a pivot axis transverse to the finger axis. Each vertebra has an axial thickness extending along the finger axis and a lateral width extending perpendicular to its axial thickness, and its lateral width is greater than its axial thickness. The at least one actuator is operable to move the second phalanx relative to the first phalanx about the pivot axis.

In some embodiments, each of the first and second phalanxes has a phalanx length that is at least 2 times the axial thickness of each of the vertebrae.

In some embodiments, the lateral width of each of the vertebrae is at least 1.5 times its axial thickness.

According to some embodiments, each of the vertebrae has a height perpendicular to each of its axial thickness and its lateral width, and the axial thickness of the vertebra varies across the height of the vertebra.

In some embodiments, at least one of the vertebrae includes a nonplanar bearing surface that engages an adjacent bearing surface of one of the first phalanx, the second phalanx, and an adjacent vertebra. The bearing surface may have at least one substantially planar section. In some embodiments, the bearing surface includes: an outer stop face configured to limit rotation of the first phalanx about the pivot axis in a first bending direction; and an angled inner face disposed at an oblique angle to the outer stop face to permit rotation of the first phalanx about the pivot axis in a second bending direction opposite the first bending direction. In some embodiments, the bearing surface further includes a neutral face located between the outer stop face and the inner angled face and disposed at an oblique angle to the outer stop face and the angled inner face.

According to some embodiments, the at least one vertebra includes a plurality of vertebrae serially arranged between the first phalanx and second phalanxes. In some embodiments, the at least one vertebra includes at least three vertebrae serially arranged between the first phalanx and second phalanxes. Each of the plurality of vertebrae may include a nonplanar bearing surface that engages an adjacent bearing face of one of the first phalanx, the second phalanx, and an adjacent vertebra. In some embodiments, at least two of the vertebrae have different axial thicknesses from one another.

The robotic end effector may further include a third phalanx proximate the distal end of the finger, and a second knuckle joint including at least one vertebra interposed between and separating the second and third phalanxes. The second knuckle joint is configured to permit the third phalanx to pivot relative to the second phalanx about a second pivot axis transverse to the finger axis. Each vertebra of the second knuckle joint has an axial thickness and a lateral width extending perpendicular to its axial thickness, and its lateral width is greater than its axial thickness. The at least one actuator is operable to move the third phalanx relative to the second phalanx about the second pivot axis.

The robotic end effector may include an elongate, flexible guide member extending from the first phalanx to the second phalanx and through the at least one vertebra to flexibly couple the first and second phalanxes and the at least one vertebra and retain the at least one vertebra between the first and second phalanxes. In some embodiments, the guide member has a Young's Modulus of less than about 2.4 GPa at 23 degrees Celsius.

The robotic end effector may include a tendon cable associated with the at least one actuator for moving the second phalanx relative to the first phalanx about the pivot axis, wherein the tendon cable extends through the at least one vertebra and applies an axially compressive load to the first phalanx, the second phalanx and the at least one vertebra to hold the first phalanx, the second phalanx and the at least one vertebra together and in contact with one another. The robotic end effector may further include a tensioning mechanism to maintain the axially compressive load. In some embodiments, the tensioning mechanism includes a spring applying a biasing load to the tendon cable.

The robotic end effector may include first and second tactile sensors mounted on the first and second phalanxes, respectively, wherein the at least one vertebra does not or do not include tactile sensors mounted thereon. The robotic end effector may further include electrical wires electrically connected to the second tactile sensor and extending from the second phalanx and through the at least one vertebra.

In some embodiments, the at least one vertebra is or are formed of a polymeric material.

According to embodiments of the invention, a robotic end effector includes a finger and at least one actuator. The finger extends from a proximal end to a distal end along a finger axis. The finger includes: a first phalanx proximate the proximal end, the first phalanx including a first phalanx cavity therein; a second phalanx proximate the distal end; and a knuckle joint coupling the first and second phalanxes and configured to permit the second phalanx to pivot relative to the first phalanx about a pivot axis. The finger further includes a tactile sensor assembly mounted on the second phalanx, first and second lead wires connected to the tactile sensor assembly, and a remote receiver. The at least one actuator is operable to move the second phalanx relative to the first phalanx about the pivot axis. The first and second lead wires extend sequentially from the second phalanx, through the knuckle joint, through the first phalanx cavity, and to the remote receiver.

In some embodiments, the tactile sensor assembly includes a resistive sensor.

According to some embodiments, the resistive sensor includes: a substrate having an inner surface; first and second electrically conductive traces disposed on the inner surface of the substrate; and an electrically conductive layer having an inner surface facing the inner surface of the first substrate. The first and second lead wires are connected to the first and second electrically conductive traces, respectively. At least one of the substrate and the electrically conductive layer is configured to deform responsive to an applied force on the resistive sensor and thereby place the electrically conductive layer in contact with the first and second electrically conductive traces to electrically connect the first and second electrically conductive traces through the electrically conductive layer.

In some embodiments, the electrically conductive layer is a semiconductor layer. In some embodiments, the semiconductor layer has a sheet resistance in the range of from about 2 kiloohms/square to 20 kiloohms/square. The semiconductor layer may be a polymeric film impregnated with an electrically conductive filler.

In some embodiments, an electrical resistance across the first and second lead wires is a function of the applied force, and the remote receiver is operative to detect the electrical resistance via the first and second lead wires.

According to some embodiments, the substrate is rigid and is interposed between the electrically conductive layer and an outer surface of the second phalanx. In some embodiments, the resistive sensor does not include any electronic components on the side of the electrically conductive layer opposite the substrate. The substrate may be a printed circuit board (PCB). In some embodiments, first and second lead wires are terminated at the PCB.

The robotic end effector may include a spacer interposed between the substrate and the electrically conductive layer, wherein the spacer maintains a gap between the electrically conductive layer and the first and second traces in the absence of an applied force.

The robotic end effector may further include: a second resistive sensor mounted on the second phalanx; and a third lead wire connected to the second resistive sensor and extending sequentially from the second phalanx, through the knuckle joint, through the first phalanx cavity, and to the remote receiver. In some embodiments, the substrate includes a printed circuit board (PCB), and the first and second resistive sensors are each mounted on the PCB. In some embodiments, the PCB is nonplanar, and the first resistive sensor is disposed at an angle relative to the second resistive sensor. According to some embodiments, the robotic end effector includes a switching circuit operative to alternatingly: electrically connect the first and second lead wires across the first resistive sensor to generate a signal to the remote receiver corresponding to a force applied to the first resistive sensor; and electrically connect the third and second lead wires across the second resistive sensor to generate a signal to the remote receiver corresponding to a force applied to the second resistive sensor.

The robotic end effector may further include a protective cover layer over the tactile sensor assembly. In some embodiments, the protective cover layer is formed of a compliant elastomeric foam.

According to some embodiments, the robotic end effector further includes: a base; a second knuckle joint coupling the first phalanx and the base, wherein the second knuckle joint is configured to permit the first phalanx to pivot relative to the base about a second pivot axis; a second tactile sensor assembly mounted on the first phalanx; third and fourth lead wires connected to the second tactile sensor assembly; and at least one actuator to move the first phalanx relative to the base about the second pivot axis. The first, second, third and fourth lead wires extend through the second knuckle joint and to the remote receiver.

The robotic end effector may further include: a third phalanx; a third knuckle joint coupling the second phalanx and the third phalanx, wherein the third knuckle joint is configured to permit the third phalanx to pivot relative to the second phalanx about a third pivot axis; a third tactile sensor assembly mounted on the third phalanx; fifth and sixth lead wires connected to the third tactile sensor assembly; and at least one actuator to move the third phalanx relative to the second phalanx about the third pivot axis. The second phalanx includes a second phalanx cavity therein. The fifth and sixth lead wires extend sequentially through the third knuckle joint, the second phalanx cavity, the first knuckle joint, the first phalanx cavity, and the second knuckle joint and to the remote receiver.

In some embodiments, the knuckle joint includes at least one vertebra interposed between and separating the first and second phalanxes. The pivot axis is transverse to the finger axis. Each vertebra has an axial thickness extending along the finger axis and a lateral width extending perpendicular to its axial thickness, and its lateral width is greater than its axial thickness. The first and second lead wires extend through the at least one vertebra.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
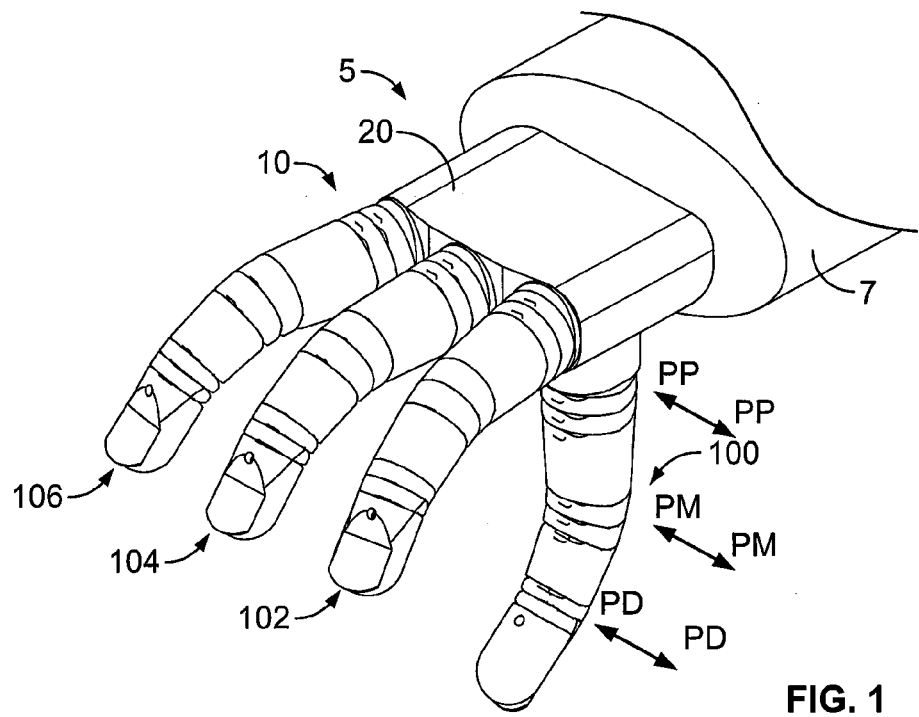
FIG. 1 is a front perspective view of a robotic arm and an end effector according to embodiments of the invention, wherein the end effector includes robotic fingers according to embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "monolithic" means an object that is a single, unitary piece formed or composed of a material without joints or seams.

Embodiments of the present invention are directed to robotic fingers and end effectors. A finger as disclosed herein may form part of a robot or a prosthetic apparatus. In particular, the robotic finger may form a part of an end effector and be used to manipulate and grasp objects in a structured or unstructured environment. The finger may be employed as a finger of a humanoid robot. Aspects of the inventive finger may enable low cost manufacture of the finger and end effector.

With reference to FIGS. 1-22, a robot 5 (FIG. 1) according to embodiments of the invention is shown therein. The robot 5 includes and arm 7 and a robotic grasper or effector 10 according to embodiments of the invention mounted on an end of the arm 7.

Figure 2:
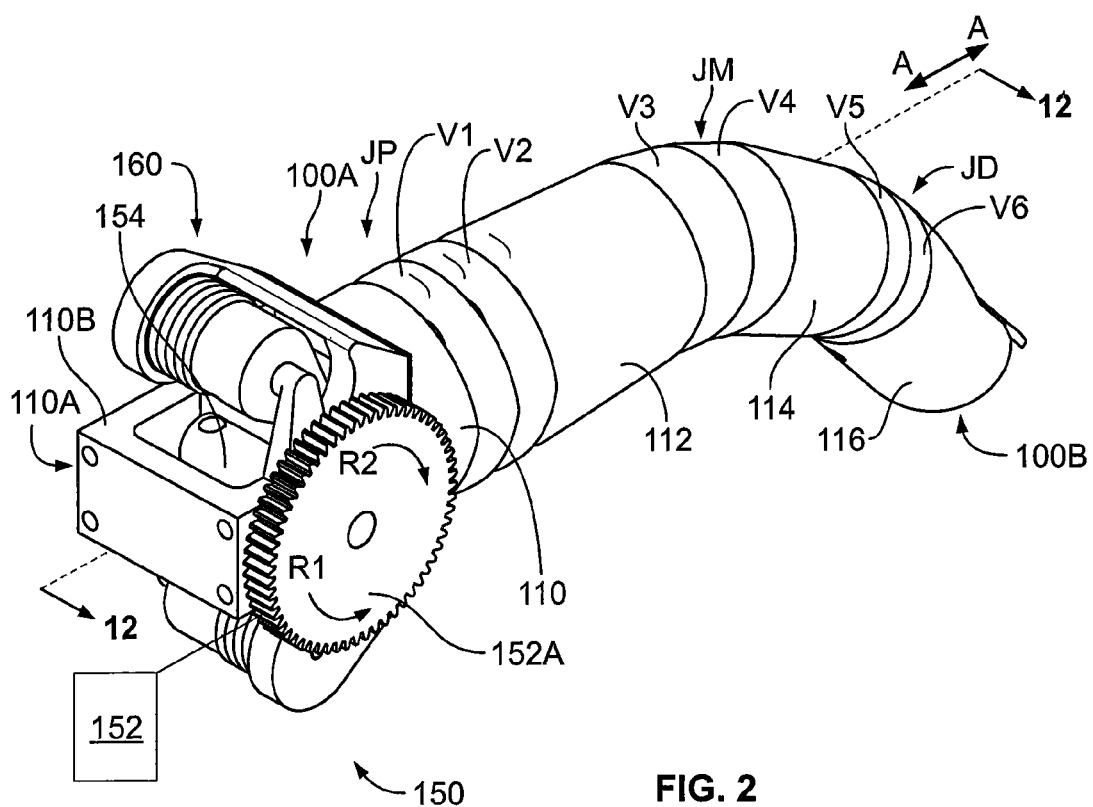
FIG. 2 is a rear perspective view of one of the robotic fingers of FIG. 1.
Figure 3:
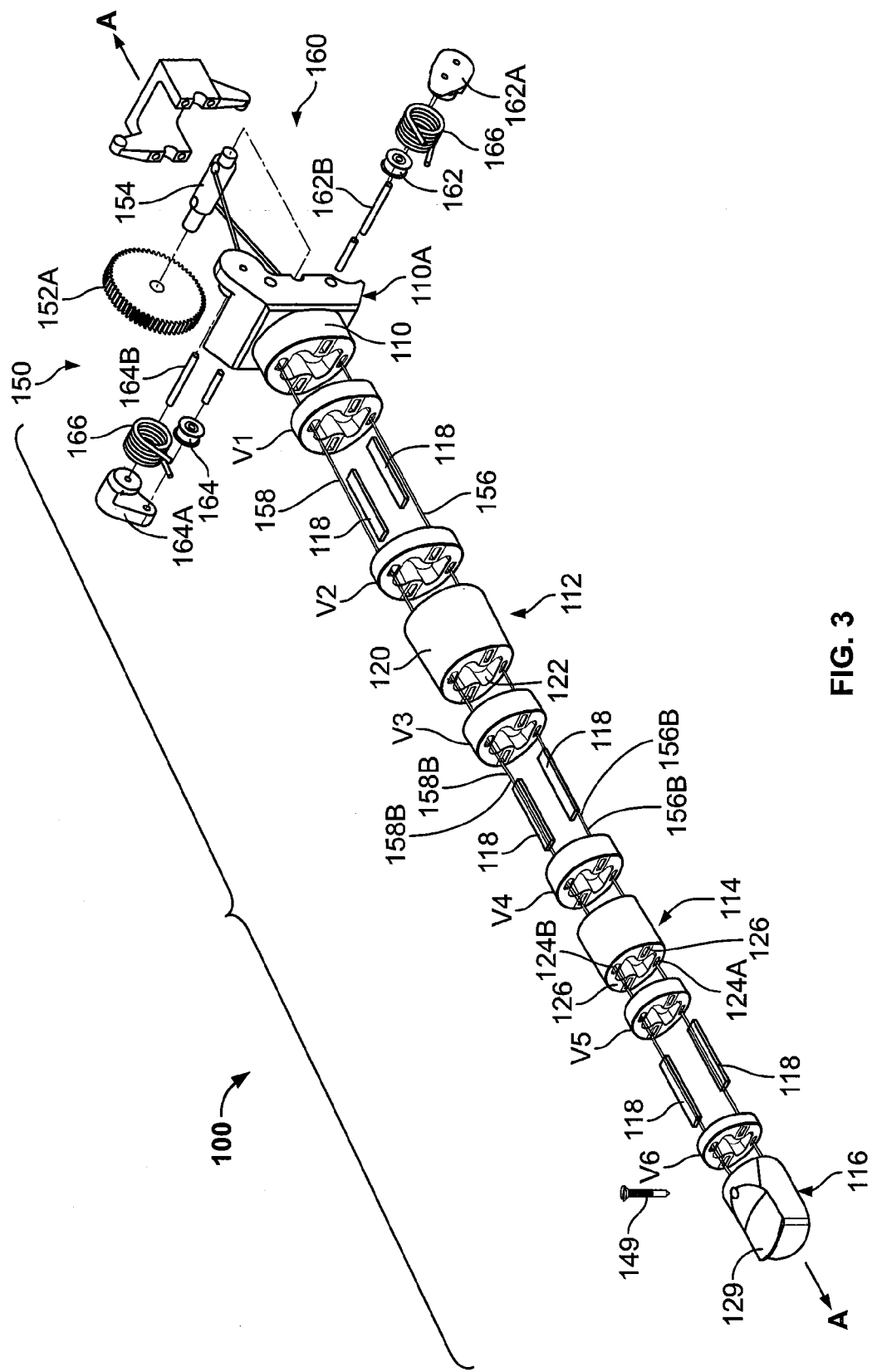
FIG. 3 is an exploded, front perspective view of the robotic finger of FIG. 2.

The end effector 10 includes a base 20 and four fingers 100, 102, 104 and 106 mounted on the base 20. Each of the fingers 100, 102, 104, 106 is further provided with a respective sensor system 170 (FIGS. 18-22) and a respective drive system 150 (FIGS. 2 and 3). In the illustrated embodiment, the fingers 102, 104, 106 generally oppose the finger 100, which may be referred to as a thumb. The fingers 100-106 may be underactuated.

The fingers 100, 102, 104, 106 may be identically or similarly constructed as discussed above. An exemplary finger 100 (i.e., the thumb) is described below, and it will be appreciated that this description likewise applies to the other fingers 102, 104, 106.

With reference to FIG. 2, the finger 100 as a longitudinal axis A-A and extends axially from a proximal end 100A to a distal end 100B. The finger 100 includes a base member 110A (which includes an integral phalanx 110), a proximal phalanx 112, a medial phalanx 114, and a distal phalanx 116. The finger 100 further includes a proximal knuckle joint JP, a medial knuckle joint JM, and a distal knuckle joint JD.

The proximal knuckle joint JP pivotally couples the proximal phalanx 112 to the base member 110A to permit relative rotation or pivoting between the members 110A, 112 about a pivot axis PP-PP transverse or perpendicular to the longitudinal axis A-A. The medial knuckle joint JM pivotally couples the medial phalanx 114 to the proximal phalanx 112 to permit relative rotation or pivoting between the members 112, 114 about a pivot axis PM-PM transverse or perpendicular to the longitudinal axis A-A. The distal knuckle joint JD pivotally couples the distal phalanx 116 to the medial phalanx 114 to permit relative rotation or pivoting between the members 114, 116 about a pivot axis PD-PD transverse or perpendicular to the longitudinal axis A-A.

In embodiments, the proximal knuckle joint JP includes two proximal vertebrae V1, V2. The medial knuckle joint JM includes two medial vertebrae V3, V4. The distal knuckle joint JD includes two distal vertebrae V5, V6. Each of the knuckle joints JP, JM, JD further includes a pair of flexible, elongate connecting ligaments, tethers, or guide members 118. The vertebrae V1, V2 are serially arranged between the adjacent ends of the phalanx 110 and the phalanx 112. The vertebrae V3, V4 are serially arranged between the adjacent ends of the phalanx 112 and the phalanx 114. The vertebrae V5, V6 are serially arranged between the adjacent ends of the phalanx 114 and the phalanx 116.

The finger 100 further includes an inner tendon cable 156 and an outer tendon cable 158, and a pin 149 securing ends of the tendon cables 156, 158. As discussed below, the tendon cables 156, 158 extend through the base member 110A and phalanxes 110, 112, 114, 116 and also form part of the knuckle joints JP, JM, JD.

Figure 18:
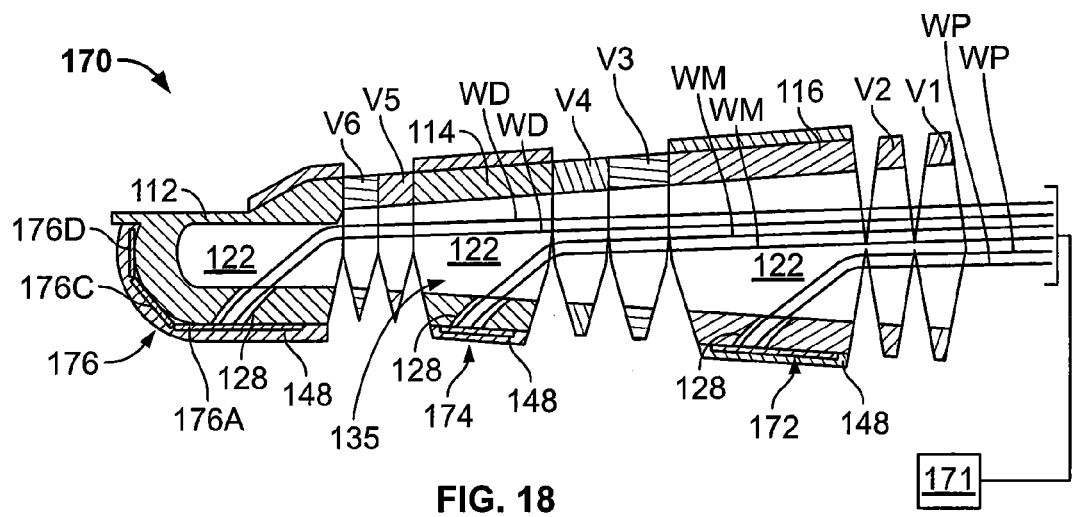
FIG. 18 is a fragmentary, cross-sectional view of the finger of FIG. 2 taken along the line 18-18 of FIG. 19, showing a sensor system forming a part of the finger.
Figure 19:
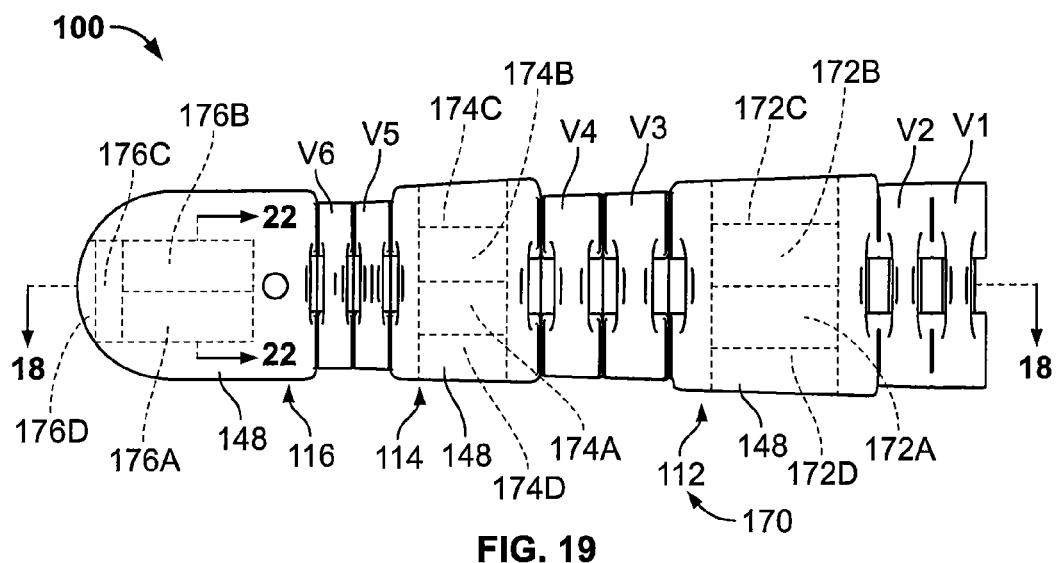
FIG. 19 is a bottom view of the finger of FIG. 2 including the sensor system of FIG. 18.
Figure 22:
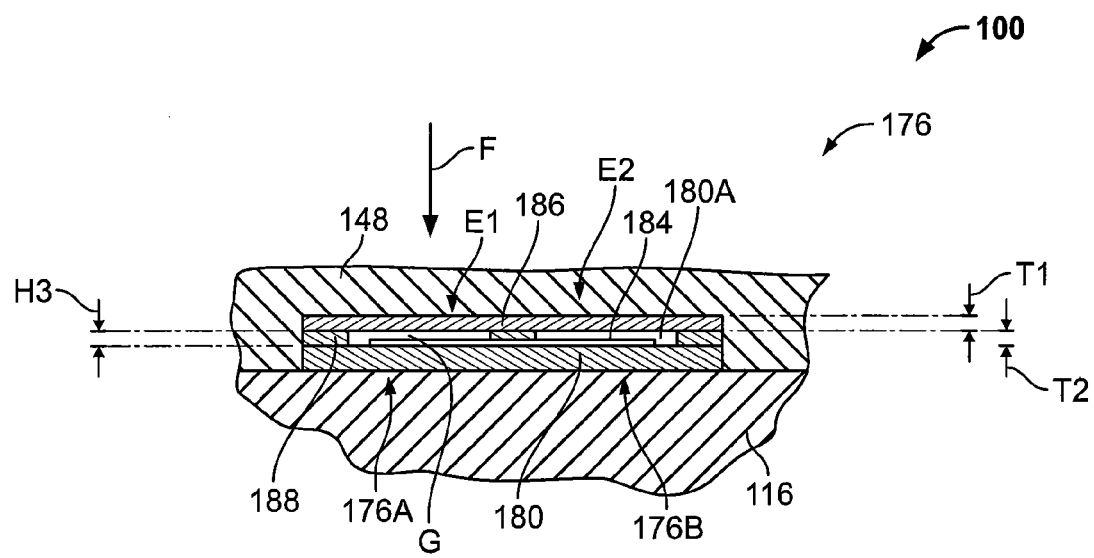
FIG. 22 is a cross-sectional view of the finger and sensor system of FIG. 18 taken along the line 22-22 of FIG. 19.

The finger 100 may be further provided with tubular outer boots or covers 148 (FIGS. 18, 19 and 22).

The base member 110A includes a housing 110B and the base phalanx 110 integral therewith.

Figure 11:
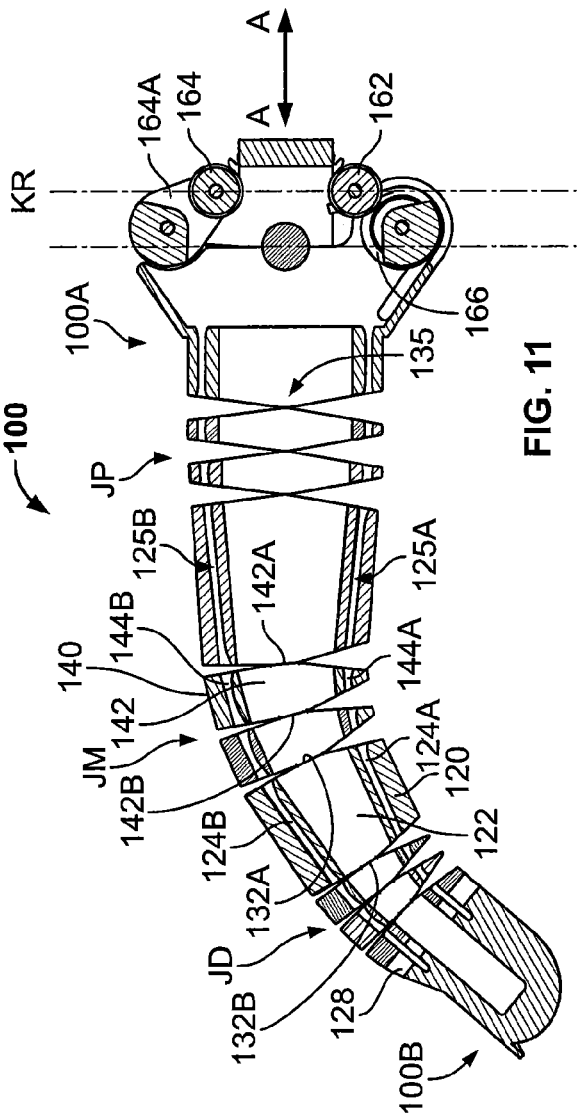
FIG. 11 is a fragmentary, cross-sectional view of the finger of FIG. 2 taken along the line 12-12 of FIG. 2, wherein the finger is shown in a neutral position.

With reference to FIG. 11, each of the phalanxes 110, 112, 114, 116 includes a body 120 and a central bore 122, an inner raceway 124A, and an outer raceway 124B extending axially fully through the body 120. While the body 120 is shown as a monolithic hollow tube, the body 120 may instead be formed from two or more joined parts. In embodiments, the body 120 may be formed of a pair of mated clamshells.

Figure 12:
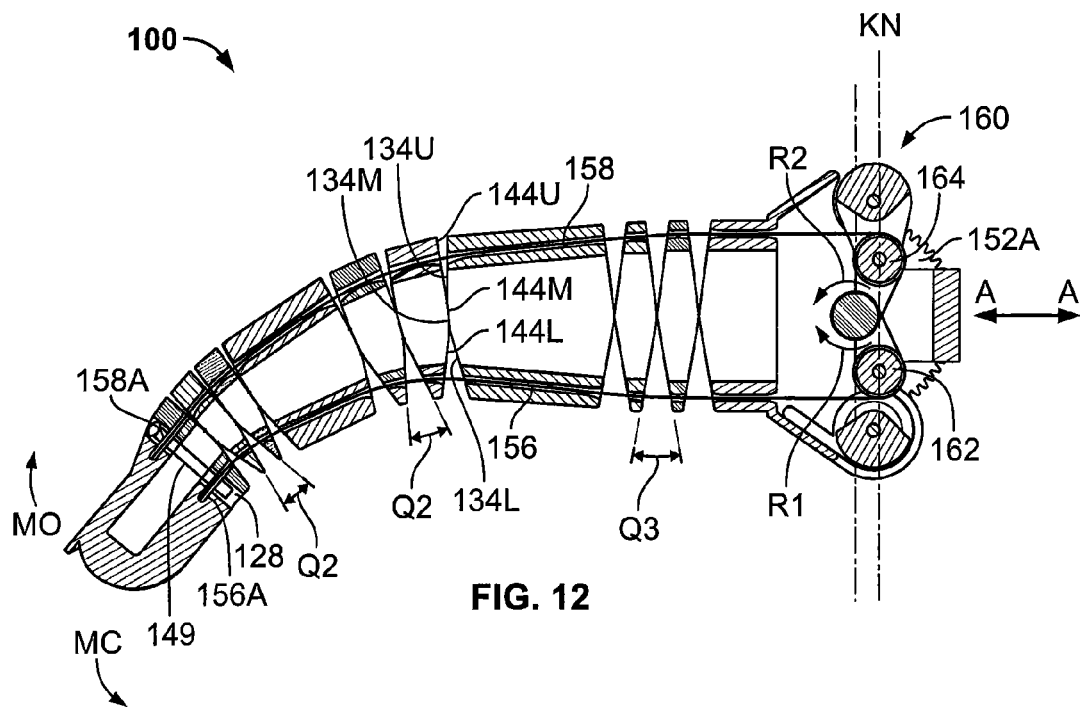
FIG. 12 is a cross-sectional view of the finger of FIG. 2 taken along the line 12-12 of FIG. 2, wherein the finger is shown in the neutral position.
Figure 13A:
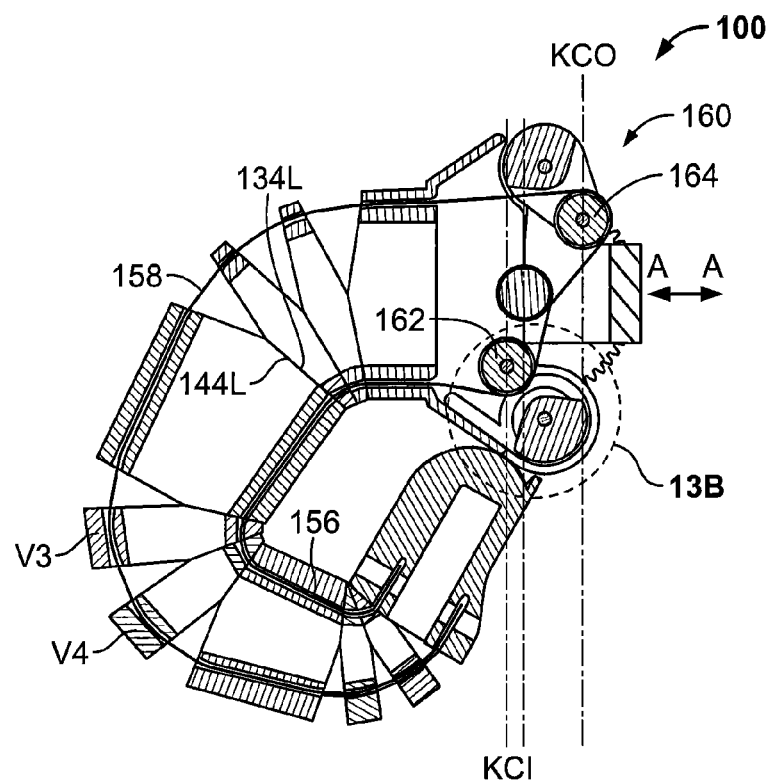
FIG. 13A is a cross-sectional view of the finger of FIG. 2 taken along the line 12-12 of FIG. 2, wherein the finger is shown in a closed position.

The phalanxes 112, 114, 116 each include a proximal bearing surface 132A. The phalanxes 110, 112, 114 each include a distal bearing surface 132B. Each of the bearing surfaces 132A, 132B is nonplanar and includes an inner section 134L and an outer section 134U (FIGS. 12 and 13A). The bearing surfaces 132A, 132B of the phalanxes 112, 114, 116 also include a midsection 134M. In some embodiments, each of the sections 134U, 134L, 134M is substantially planar and disposed at an angle to each of the other two sections. The distal phalanx 116 is further provided with a pinhole 128 and a fingernail feature 129.

Figure 10:
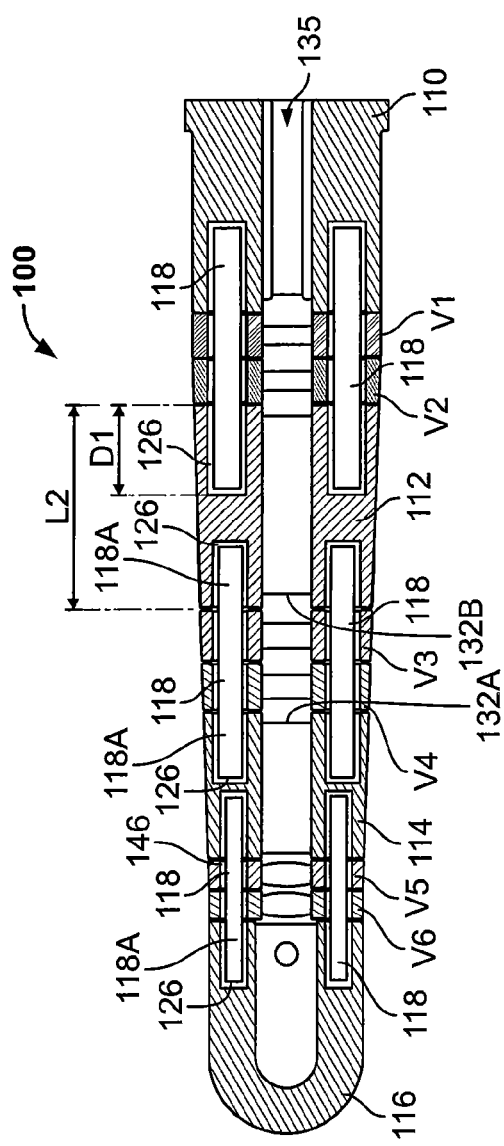
FIG. 10 is a fragmentary, cross-sectional view of the finger of FIG. 2 taken along the line 10-10 of FIG. 9.

Two laterally opposed guide member slots 126 are formed in each of the bearing surfaces 132A, 132B. Each guide member slot 126 is a blind pocket or cavity that is open at the corresponding bearing surface 132A, 132B and closed at its opposite axial end within the body 120 of the phalanx. Each guide member slot 126 has a prescribed axial depth D1 (FIG. 10). According to some embodiments, the depth D1 is in the range of from about 20% to 50% of the axial length L2 (FIG. 10) of the phalanx 110-116, and in embodiments is 40% of the axial length L2.

Each of the phalanxes 112, 114, 116 includes a lead wire bore or port 128 (FIGS. 9 and 18) extending radially through the body 120 from the central bore 122 to the exterior of the phalanx. In embodiments, the wire port 128 of each phalanx 112, 114, 116 is angled in the radially inward direction toward the proximal end 100A of the phalanx (FIG. 18). This directionality assists with feeding wires from the exterior of the phalanx into the central bore 122 and down to a remote receiver 171 at the base of the finger 100 or in the hand 20.

Figure 4:
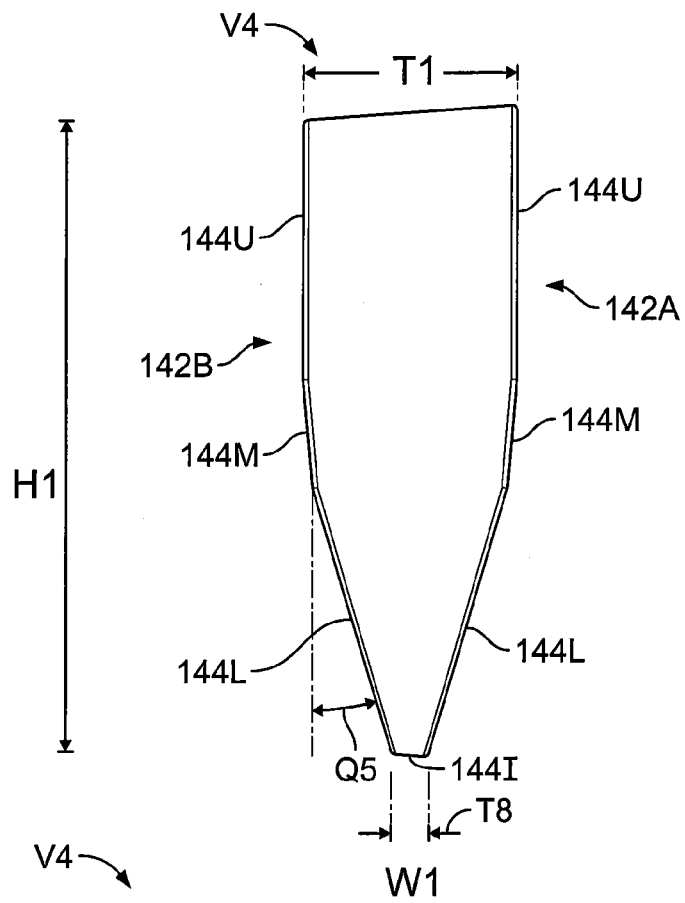
FIG. 4 is a side elevational view of a vertebra forming a part of a medial knuckle joint of the robotic finger of FIG. 2.
Figure 5:
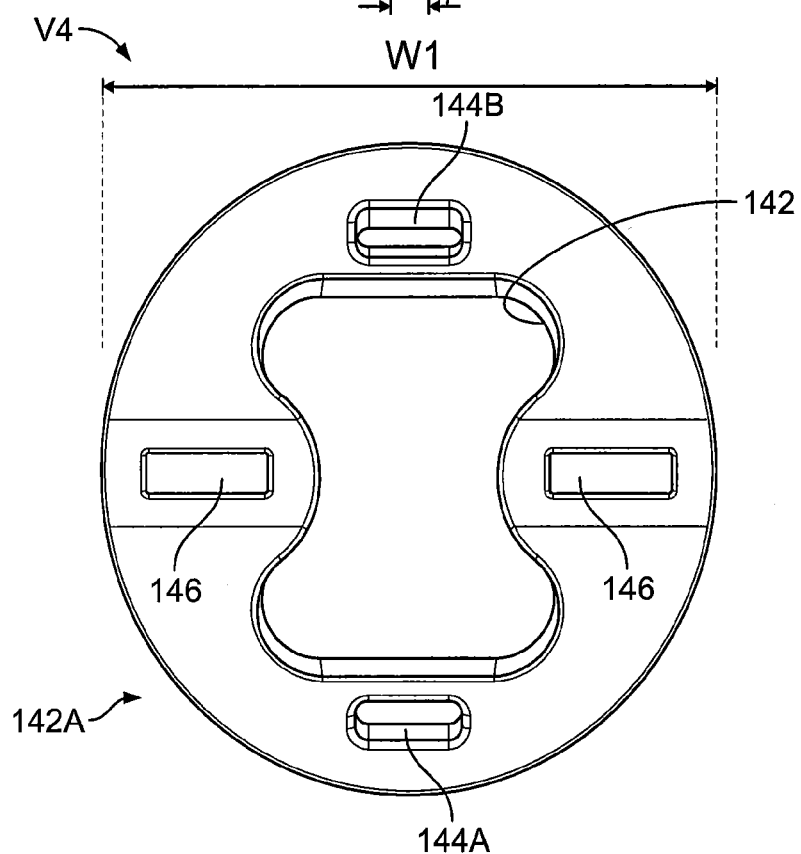
FIG. 5 is rear view of the vertebra of FIG. 4.

With reference to FIGS. 4-9, each of the vertebrae V1-V6 includes a body 140, a central bore 142, an inner raceway 144A, and an outer raceway 144B, a proximal bearing surface 142A, a distal bearing surface 142B, and pairs of guide member slots 146 formed in each of the bearing surfaces 142A, 142B. The guide member slots 146 extend fully through the thickness of the vertebra and terminate at opposed slot openings at the bearing surfaces 142A, 142B. Each of the bearing surfaces 142A, 142B is nonplanar and includes an inner section 144L and an outer section 144U. The bearing surfaces 142A, 142B of the vertebrae V3-V6 also include a midsection 144M (FIGS. 4 and 5). In some embodiments, each of the sections 144U, 144L, 144M is substantially planar and is disposed at an angle to each of the other two sections.

With reference to FIGS. 3 and 10, each guide member 118 extends from a phalanx proximal bearing surface 132A to the opposing phalanx bearing surface 132B, and through the interposed vertebrae V1-V6. The ends 118A of each guide member 118 are slidably received in the guide member slots 126 of the opposed phalanxes and extend slidably through the guide member slots 146 of the interposed vertebrae. In some embodiments and as illustrated, the cross-sectional shapes of the slots 126, 146 are substantially congruent to the cross-sectional shapes of the guide members 118 received therein.

In other embodiments, one end 118A of each guide member 118 is secured (e.g., by adhesive, heat welding, molding or a fastener) in its guide member slot 126 while the other end of that guide member 118 remains slidably seated in its guide member slot 126.

With reference to FIGS. 3, 11, and 12, the inner tendon cable 156 extends from a drive spool 154 and through the inner raceways 124A, 144A to the distal phalanx 116. The outer tendon cable 158 extends from the drive spool and through the outer raceways 124B, 144B to the distal phalanx 116. In some embodiments, each tendon cable 156, 158 includes two parallel strands 156B, 158B (FIG. 3) connected at a closed loop 156A, 158A (FIG. 12) at its distal terminal end (e.g., a single continuous strand is folded 180 degrees at the distal end). The pin 149 extends through the pinhole 128 and the end loops 156A, 158A to thereby secure the ends of the tendon cables 156, 158 in the distal phalanx 116. The tendon cables 156, 158 are slidably received in each of the raceways 124A, 124B, 144A, 144B. Each of the raceways 124A, 124B, 144A, 144B may be provided with rounded, flared, funnel-shaped, or radiused inlets and outlets.

Figure 15:
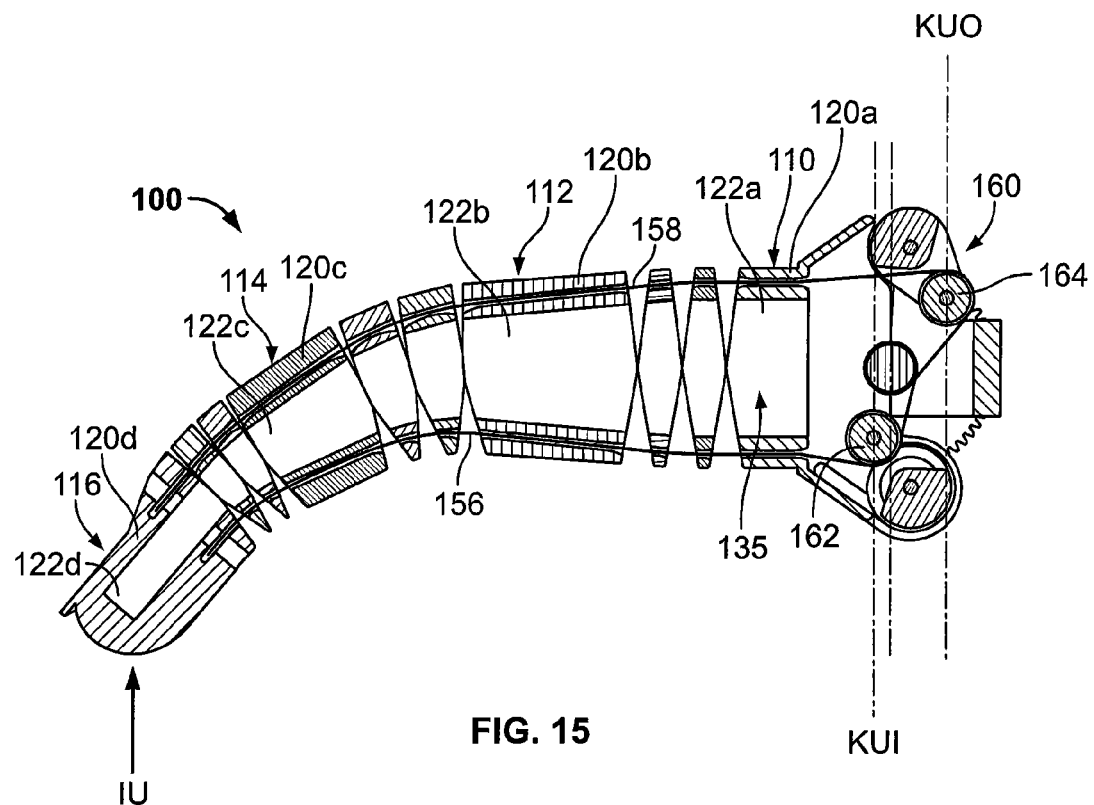
FIG. 15 is a cross-sectional view of the finger of FIG. 2 taken along the line 12-12 of FIG. 2, wherein the finger is shown overloaded by an upward external load.

The central bores 122, 142 of the phalanxes 110-116 and the vertebrae V1-V6 collectively define or form a finger central bore 135 (FIG. 11) extending axially continuously the length of the finger 100 from the base member 110A to the distal phalanx 116. Referring to FIG. 15, it can be seen that the phalanxes 110, 112, 114 and 116 have bodies 120a, 120b, 120c and 120d, respectively, which have central bores 122a, 122b, 122c and 122d, respectively, that combine, sequentially and end to end, with one another and the central bores 142 of the vertebrae V1-V6 to form the finger central bore 135.

The guide members 118 and the tendon cables 156, 158 each form parts of the knuckle joints JP, JM, JD. The guide members 118 couple the adjacent ends of the phalanxes 110, 112, 114, 116 and the vertebrae V1-V6 together at the knuckle joints JP, JM, JD. The guide members 118 and the tendon cables 156, 158 also prevent the vertebrae from falling out position between the phalanxes. The guide members 118 and the tendon cables 156, 158 are compliant, bendable or flexible so that the phalanxes 110-116 can be relatively pivoted about the pivot axes PP-PP, PM-PM, PD-PD. As discussed below, the guide members 118 and the tendon cables 156, 158 may also permit limited bending of the finger 100 at the knuckle joints JP, JM, JD in lateral directions about sideward axes PSP-PSP, PSM-PSM, PSD-PSD (FIG. 8) that are transverse to both the finger longitudinal axis A-A and the primary pivot axes PP-PP, PM-PM, PD-PD (FIGS. 2 and 9). As discussed below, the guide members 118 and the tendon cables 156, 158 may also permit limited twisting of the finger 100 at the knuckle joints JP, JM, JD about the finger axis A-A.

According to some embodiments, the guide members 118 have a low stiffness and low elasticity so that they do not provide substantial resistance to bending of the finger 100 at the knuckle joints JP, JM, JD and do not provide substantial return force when the finger 100 is bent. According to some embodiments, the guide members 118 have a Young's modulus of less than 2.4 GPa at 23 degrees Celsius.

According to some embodiments, the cross-sectional shape of each guide member 118 is rotationally asymmetric (e.g., nonsquare rectangular) so that the guide members 118 are more compliant in one bending direction than another. In some embodiments and as shown, the guide members 118 are flat, elongate strips that have greater width in a direction parallel to the associated pivot axis PP-PP, PM-PM, PD-PD than their thickness in a direction perpendicular to the associated pivot axis PP-PP, PM-PM, PD-PD.

According to some embodiments, the tendon cables 156, 158 have a low stiffness and low elasticity so that, absent a tension load applied to the tendon cables 156, 158, they do not provide substantial resistance to bending of the finger 100 at the knuckle joints JP, JM, JD and do not provide substantial return force when the finger 100 is bent.

According to some embodiments and as described below, a tension load is maintained on each of the tendon cables 156, 158. As a result, the tendon cables 156, 158 draw together and apply an axially compressive load to the phalanxes 110-116 and the vertebrae V1-V6 such that their respective adjacent bearing surfaces 132A, 132B, 142A, 142B are held in axially loaded abutment when stationary and throughout their intended ranges of movement.

The phalanxes 110-116 may be formed of any suitable material(s) and may be formed of different materials from one another. In some embodiments, the phalanxes 110-116 are formed of a polymeric material and, in some embodiments, a molded (e.g., injection molded) polymeric material. Suitable polymeric materials may include ABS, polycarbonate, nylon, acetal or PVC. According to some embodiments, the phalanxes 110-116 are formed of a material having a stiffness in the range of from about 2 to 6 GPa.

The vertebrae V1-V6 may be formed of any suitable material(s) and may be formed of different materials from one another and/or different from the phalanxes 110-116. In some embodiments, the vertebrae V1-V6 are formed of a polymeric material and, in some embodiments, a molded (e.g., injection molded) polymeric material. Suitable polymeric materials may include ABS, polycarbonate, nylon, acetal or PVC. According to some embodiments, the vertebrae V1-V6 are formed of a material having a stiffness in the range of from about 2 to 6 GPa.

The guide members 118 may be formed of any suitable material(s). In some embodiments, the guide members 118 are formed of a polymeric material and, in some embodiments, a molded polymeric material. Suitable polymeric materials may include nylon or polyurethane. According to some embodiments, the guide members 118 are formed of a material having a Young's modulus of less than about 2.4 GPa at 23 degrees Celsius. In some embodiments, the guide members 118 can be formed of a stiff material such as spring steel that is thin or comprised of a stack of thin members to achieve the desired flexibility.

The tendon cables 156, 158 may be formed of any suitable material(s). In some embodiments, the tendon cables 156, 158 are formed of a polymeric material. Suitable polymeric materials may include ultra-high molecular weight polyethylene (UHMWPE). In some embodiments, the tendon cables 156, 158 are formed of metal. Suitable metals may include carbon steel of stainless steel.

According to some embodiments, the tendon cables 156, 158 are formed of a material having a modulus of elasticity in the range of from about 150 GPa to 200 GPa. According to some embodiments, the tendon cables 156, 158 are formed of a material having an ultimate tensile strength in the range of from about 2.5 GPa to 3.5 GPa.

The covers 148 may be formed of any suitable material(s). The covers 148 maybe cast or injection molded. In some embodiments, the covers 148 are formed of a polymeric material. In some embodiments, the covers 148 are formed of a polymeric foam. Suitable polymeric materials may include urethane, polyurethane, rubber, or EPDM. According to some embodiments, the covers 148 are formed of a material having a hardness in the range of from about 20 Shore A to 80 Shore A. According to some embodiments, the covers 148 have a thickness in the range of from about 1 mm to 6 mm.

With reference to FIGS. 2, 3 and 12, the drive system 150 includes an actuator 152, a driven gear 152A, a spool 154, and a tensioning mechanism 160. The actuator 152 may be an electric motor, for example. The driven gear 152A is connected to the output shaft of the actuator 152 (e.g., via a drive gear) such that the actuator 152 can selectively forcibly driven the gear 152A in either rotational direction. The spool 154 is connected to the driven gear 152A for rotation therewith. A controller associated with the robot 5 can be used to selectively drive the spool 154 in opposed rotational directions R1 and R2 (which may be referred to herein as clockwise and counterclockwise directions for the purpose of explanation).

The tensioning mechanism 160 (FIGS. 2, 3 and 12) includes an inner swingarm 162A pivotally mounted on the housing 110B by a pivot pin 162B. The tensioning mechanism 160 further includes an outer swingarm 164A pivotally mounted on the housing 110B by a pivot pin 164B. An inner guide roller 162 and an outer guide roller 164 are mounted on the swingarms 162A and 164A, respectively. A torsion spring 166 is connected to each of the swingarms 162A and 162B to bias or force the swing arms 162A and 162B into or toward the relaxed positions KR as shown in FIG. 11. As discussed herein, the tensioning system 160 includes a mechanism to transition the tendon cable tension from being dictated by the springs 166 to being completely countered by the structure of the housing 110B.

The tendon cables 156, 158 are each connected at their proximal ends to the spool 154 to be taken up and payed out from the spool 154 as the spool 154 is rotated in either direction R1, R2. In some embodiments, the ends of the strands 156B or 158B are knotted at the distal end of the associated tendon cable 156, 158 and the knot is housed in the spool 154.

The inner tendon cable 156 is routed from the spool 154, over the outside of the guide roller 162, through the raceways 124A, 144A, and to the termination pin 149. The outer tendon cable 158 is routed from the spool 154, over the outside of the guide roller 164, through the raceways 124B, 144B, and to the termination pin 149.

In a prescribed neutral position as shown in FIG. 12, the rollers 162, 164 are displaced from the positions KR as shown in FIG. 11 to neutral positions KN as shown in FIG. 12. The springs 166 are thereby displaced from their relaxed positions and apply a return bias or force to the rollers 162, 164 and the tendon cables 156, 158. As a result, in the neutral position the springs 166 apply the tension load to the tendon cables 156, 158 to provide a persistent compressive loading on the phalanxes 110-116 and the vertebrae V1-V6.

The sensor system 170 (FIGS. 18-22) includes a proximal tactile sensor assembly 172, a medial tactile sensor assembly 174, a distal tactile sensor assembly 176, insulated electrical lead wires WP, WM, WD, and a remote receiver 171.

With reference to FIG. 19, the proximal sensor assembly 172 includes sensors 172A, 172B, 172C, and 172D. The sensors 172A and 172B cover side-by-side inner, central surfaces of the proximal phalanx 112. The sensors 172C, 172D each cover opposing adjacent side surfaces of the proximal phalanx 112.

The medial sensor assembly 174 includes sensors 174A, 174B, 174C, and 174D. The sensors 174A and 174B cover side-by-side inner, central of the medial phalanx 114. The sensors 174C, 174D each cover opposing adjacent side surfaces of the medial phalanx 114.

The distal sensor assembly 176 includes sensors 176A, 176B, 176C and 176D. The sensors 176A, 176B cover side-by-side proximal or main inner, central surfaces of the distal phalanx 116. The sensor 1760 covers a distal or fingertip surface of the distal phalanx 116. The sensor 176C covers a transitional surface of the distal phalanx 116 between the main surfaces and the fingertip surface.

The placements and layouts of the sensors 172A-D, 174A-D and 176A-D as described above and shown in FIGS. 18 and 19 are exemplary of some embodiments. However, other placements and layouts may be employed in accordance with embodiments of the invention. In particular, the sensors can be distributed over the surfaces of the phalanxes 110-116 as desired, including on the back sides of the phalanxes 110-116 and even on the fingernail feature 129 to sense forces applied to the fingernail feature 129.

The construction and operation of the distal sensor assembly 176 will be described immediately below. However, this description generally applies to the construction and operation of the sensor assemblies 172, 174, as well.

Figure 20:
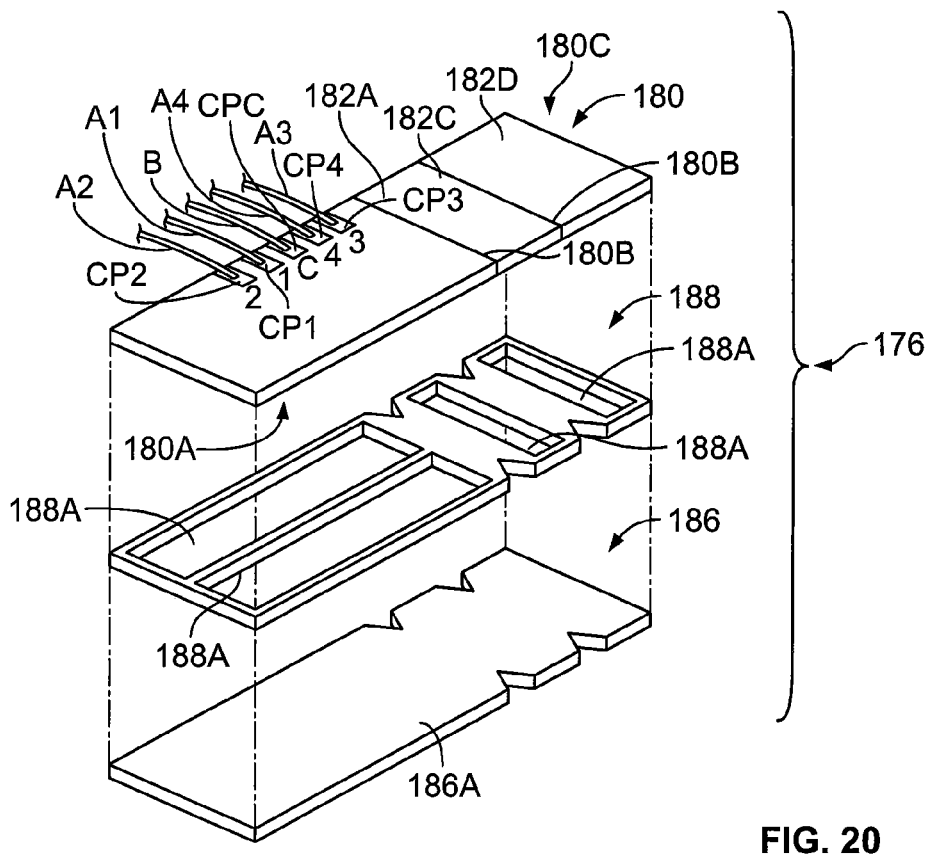
FIG. 20 is an exploded, perspective view of a sensor assembly forming a part of the sensor system of FIG. 18.
Figure 21:
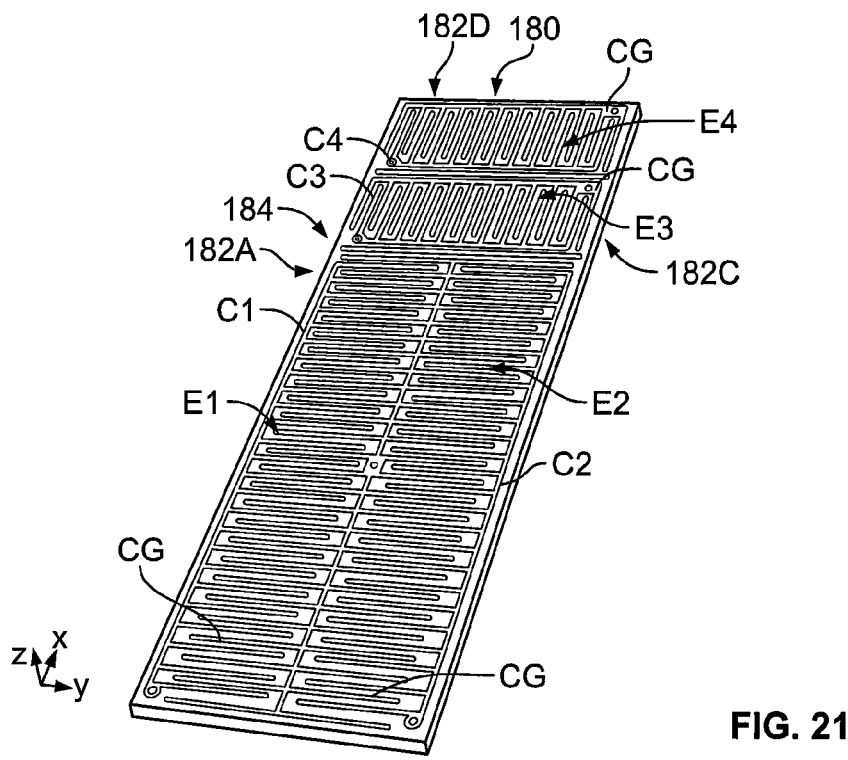
FIG. 21 is a perspective view of a printed circuit board forming a part of the sensor of assembly of FIG. 20.

With reference to FIGS. 20-22, the distal sensor assembly 176 includes a substrate (PCB) 180, an electrically conductive layer 186, and a spacer 188. The electrically conductive layer 186 may be resistive. In some embodiments, the spacer 188 is omitted.

The PCB 180 includes an inner surface 180A. The PCB 180 is divided into a proximal PCB section 182A, a medial PCB section 182C, and a distal PCB section 182D separated by bend or break lines 180B. According to some embodiments, the PCB 180 is rigid.

FIG. 21 illustrates the PCB 180 in greater detail. Referring to FIG. 21, an electrically conductive trace pattern 184 is provided on the inner surface 180A. The pattern 184 defines four electrically conductive traces C1-C4, each defining a respective sensor area or sensing zone E1-E4. The traces C1, C2, C3, and C4 each define electrical contacts that are interdigitated with electrical contacts of a common trace CG.

The traces C1-C4 are coupled to respective electrically conductive surface mount contact pads CP1, CP2, CP3, CP4 on the backside outer surface 180C of the PCB 180. Selection lead wires A1, A2, A3 and A4 are electrically and mechanically terminated on or connected to the contact pads CP1, CP2, CP3 and CP4, respectively. The contact pad CPG is electrically connected to the common trace CG by output lead wire B, which provides an input to an analog to digital converter on a microcontroller that is off-board (not shown).

With reference to FIG. 21, the traces C1 extend across a first sensing zone or region E1 corresponding to the sensor 176A. The traces C2 extend across a second sensing zone or region E2 corresponding to the sensor 176B. The traces C3 extend across a third sensing zone or region E3 corresponding to the sensor 176C. The traces C4 extend across a fourth sensing zone or region E4 corresponding to the sensor 176D.

The electrically conductive layer 186 has an electrically conductive inner surface 186A. The sections of the conductive layer 186 overlying the sensing regions E1, E2, E3 and E4 form parts of the sensors 172A, 172B, 172C and 172D, respectively.

The electrically conductive layer 186 is formed of a compliant, pliable, flexible, thin material. According to some embodiments, the layer 186 is monolithic.

According to some embodiments, the layer 186 has a thickness T1 (FIG. 22) in the range of from about 0.05 to 0.2 mm and, in some embodiments, from about 0.1 to 0.2 mm.

According to some embodiments, the layer 186 is a semiconductor layer. In some embodiments, the semiconductor layer 186 has a sheet resistance in the range of from about 2 kiloohms/square to 20 kiloohms/square. In some embodiments, the semiconductor layer 186 is a polymeric film impregnated with an electrically conductive filler (e.g., a polyoletin or polyethylene film containing a substantially homogenous fill of carbon black, silver or other conductive particles). Suitable materials for the semiconductor layer 186 may include VELOSTAT™ film available from 3M Company of Minnesota or LINQSTAT film available from Caplinq Corporation of The Netherlands.

The spacer 188 includes windows or openings 188A defined therein. According to some embodiments, the spacer 188 has a thickness T2 (FIG. 22) in the range of from about 0.1 to 0.3 mm. According to some embodiments, the spacer 188 is formed of an electrically insulating material. Suitable materials for the spacer 188 may include a polymeric material such as polyimide film. In some embodiments, the spacer 188 is a double-sided adhesive tape.

With reference to FIGS. 18 and 20, the PCB 180, the spacer 188 and the electrically conductive layer 186 are stacked such that the spacer 188 is sandwiched or interposed between the PCB 180 and the conductive layer 186 and the inner surfaces 180A and 186A face one another. The openings 188A overlie the sensing regions E1-E4 so that the inner surface 180A is exposed to the inner surface 186A. The spacer 188 separates and defines a gap G between the inner surfaces 180A and 186A. According to some embodiments, the gap G has a height H3 (FIG. 22) in the range of from about 0.1 to 0.3 mm. The gap G may be nonexistent (i.e., H3 is zero) if the spacer 188 is omitted.

In use, the selection wires A1-A4 are used by the off-board microcontroller, or other switching circuit, to switch between the traces C1-C4, in sequence. A difference in resistance between the currently active one of the traces C1-C4 and the common trace CG (for example, responsive to pressure on the conductive layer 186) can cause a change in the reading on the input to the microcontroller provided by output wire B. The sequential switching among the selection wires A1-A4 may be implemented using FETs in the microcontroller's digital outputs, or even by a respective external FET for each trace C1-C4.

While embodiments of the present invention as illustrated in FIGS. 20-22 are described herein with reference to an off-board microprocessor that is configured to sequentially switch among the traces C1-C4 of the respective sensing zones E1-E4, it will be understood that other implementations may be used in accordance with the present invention. For example, in some embodiments, an on-board multiplexer or other switching circuit may be coupled between the contact pads CP1, CP2, CP3, CP4, CPG and the traces C1-C4 to control the sequential switching among the traces C1-C4 (i.e., a multiplexer or switching circuit may be integrally mounted on the PCB 180 mounted on the finger phalanx). Such an embodiment may likewise include five wires extending from the outer surface 180C of the PCB 180: a power wire, a ground wire, two select line wires (for selecting among the four traces C1-C4), and an analog output wire. Alternatively, in other embodiments, each of the four traces C1-C4 may have its own dedicated selection line wire and output line wire, resulting in a total of eight wires extending from the outer surface 180C of the PCB 180.

Also, although illustrated with reference to a single, continuous conductive film 186, it will be understood that the conductive film 186 may alternatively be divided into multiple, isolated sections (for example, corresponding to each of the sensing zones E1-E4), which may reduce or eliminate contributions from zones other than the selected zone in the output.

The finger 100 may be assembled as follows in accordance with embodiments of the invention. The modular design of the finger 100 permits assembly without special equipment or skill.

The distal sensor assembly 176 is mounted on the exterior of the distal phalanx 116 such that the PCB 180 is interposed between the phalanx 116 and the conductive layer 186 (i.e., the conductive layer 186 is on the outwardly facing ride of the sensor assembly 176). The PCB 180 may be affixed to the phalanx 116 by adhesive, for example. The sensors 176A-176D overlie the main, transitional and fingertip surfaces of the phalanx as discussed above. As shown in FIGS. 18 and 19, the sections 182A-182D of the PCB 180 follow the contour of the fingertip of the distal phalanx 116 so that the sensors 174C and 174D are disposed at an angle with respect to each other and the sensors 174A, 174B.

The lead wires A1-A4, 13 (generally referred to herein and designated in FIG. 18 as lead wires WD) from the sensor assembly 176 are routed into the central bore 122 of the phalanx 116 through the wire port 128. For clarity, only two lead wires WD are illustrated in FIG. 18; however, in practice there will be five lead wires WD extending through the central bore 122. The angled geometry of the wire port 128 directs the lead wires WD toward the proximal end of the phalanx 116. Lengths of the lead wires WD extend out from the phalanx 116. The cover 148 is mounted over the phalanx 116 and the sensor assembly 176.

Two guide members 118 are inserted into the guide member slots (pockets) 126 of the distal phalanx 116. The vertebrae V5, V6 are then mounted on the subassembly such that the guide members 118 extend through the guide member slots 146 of the vertebrae V5, V6 and the wires WD extend through the central bores 142 of the vertebrae V5, V6.

The medial sensor assembly 174 is mounted on (e.g., affixed by adhesive to) the exterior of the medial phalanx 114 such that the PCB 180 is interposed between the phalanx 114 and the conductive layer 186. The sensors 174A-174O of the medial sensor assembly 174 overlie the main and lateral side surfaces of the phalanx 114 as discussed above and shown in FIGS. 18 and 19.

In some embodiments, the sensors 172A-D, 174A-D, 176A-D are affixed directly to the outer surfaces of the phalanxes 110-116. Mounting the sensors in this manner can provide a number of advantages. Such mounting can provide more sensitive sensor response and can permit a more streamlined finger with more accurate dexterity.

The lead wires WM from the sensor assembly 174 are routed into the central bore 122 of the phalanx 114 through the wire port 128. For clarity, only two lead wires WM are illustrated in FIG. 18; however, in practice there will be five lead wires WM extending through the central bore 122. The angled geometry of the wire port 128 directs the lead wires WM toward the proximal end of the phalanx 114. Lengths of the lead wires WM extend out from the phalanx 114. The cover 148 is mounted over the phalanx 114 and the sensor assembly 174.

This subassembly is then mounted on the foregoing subassembly of components 116, 176, 148 such that the lead wires WD extend through the bore 122 of the medial phalanx 114 and out beyond the proximal end of the phalanx 114. The proximal ends of the guide members 118 are inserted into the distal end guide member slots 126 of the medial phalanx 114.

Two guide members 118 are seated in the guide member slots 126 (proximal side) of the medial phalanx 114. The vertebrae V3, V4 are then mounted on the foregoing subassembly such that the guide members 118 extend through the guide member slots 146 of the vertebrae V3, V4 and the wires WD, WM extend through the central bores 142 of the vertebrae V3, V4.

The proximal sensor assembly 172 is mounted on (e.g., affixed by adhesive) the exterior of the proximal phalanx 112 such that the PCB 180 is interposed between the phalanx 112 and the conductive layer 186. The sensors 172A-172D of the proximal sensor assembly 172 overlie the main and lateral side surfaces of the phalanx 112 as discussed above and shown in FIG. 19.

The lead wires WP from the sensor assembly 172 are routed into the central bore 122 through the wire port 128. For clarity, only two lead wires WP are illustrated in FIG. 18; however, in practice there will be five lead wires WP extending through the central bore 122. The angled geometry of the wire port 128 directs the lead wires WP toward the proximal end of the phalanx 112. Lengths of the lead wires WP extend out from the phalanx 112. The cover 148 is mounted over the phalanx 112 and the sensor assembly 172.

This subassembly is then mounted on the foregoing subassembly of components 116, 176,114, 174, 148 such that the lead wires WD, WM extend through the bore 122 of the proximal phalanx 112 and out beyond the proximal end of the phalanx 112. The proximal ends of the guide members 118 are seated in the distal end guide member slots 126 of the proximal phalanx 112. It will be appreciated that at this time a bundle of the lead wires WD, WM, WP extends from the proximal end of the proximal phalanx 112.

Two guide members 118 are seated in the guide member slots 126 (proximal side) of the proximal phalanx 112. The vertebrae V1, V2 are then mounted on the foregoing subassembly such that the guide members 118 extend through the guide member slots 146 of the vertebrae V1, V2 and the wires WD, WM, WP extend through the central bores 142 of the vertebrae V1, V2.

The base member 110A is then mounted on the foregoing subassembly of components 116, 176, 114, 174, 112, 172, 148 such that the lead wires WD, WM, WP extend through the bore 122 of the base phalanx 110 and out beyond the proximal end of the base phalanx 110. The proximal ends of the guide members 118 are seated in the distal end guide member slots 126 of the base phalanx 110. At this time the bundle of lead wires WD, WM, WP extends from the proximal end of the base phalanx 110 and into the housing 110B. It will be appreciated that the phalanxes 110, 112, 114, 116 and the vertebrae V1-V6 are now loosely and slidably coupled together and rotationally and laterally aligned by the guide members 118.

The tendon cables 156, 158 are then installed and secured in the finger 100. The inner tendon cable 156 is inserted from the proximal end of the base phalanx 110 and serially through the inner raceways 124A, 144A of the phalanxes 112-116 and vertebrae V1-V6 until the end loop 156A is positioned at the pinhole 128, as shown in FIG. 12. The outer tendon cable 158 is inserted from the proximal end of the base phalanx 110 and serially through the outer raceways 124B, 144B of the phalanxes and vertebrae until the end loop 158A is positioned at the pinhole 128, as shown in FIG. 12. The pin 149 is then inserted into the pinhole 128 and through the end loops 156A, 158A and secured in place to thereby anchor the tendon cables 156, 158. The proximal ends of the tendon cables 156, 158 are secured to the spool 154 from opposite sides.

The robotic end effector 10 and finger 100 may be used as follows in accordance with embodiments of the invention. The fingers 100, 102, 104, 106 may each be operated to bend into open and closed positions as described below. The fingers 100-106 may be operated independently of one another. The fingers 100-106 may be operated cooperatively to execute desired actions such as grasping. Operation of the finger 100 will be described in detail hereinbelow. However, it will be appreciated that this description likewise applies to the fingers 102, 104, 106.

Initially, the spool 154 of the finger 100 may be set to a neutral position thereby causing the finger 100 to assume a prescribed neutral position as shown in FIGS. 1, 2 and 12. In some embodiments, the finger 100 is curved in the neutral position to emulate the posture of a relaxed human finger. In the neutral position, the phalanxes 112, 114, 116 and the vertebrae V3-V6 abut on their respective planar midsections 134M, 144M. In some embodiments, in the neutral finger position the inner tendon cable 156 and the outer tendon cable 158 are under substantially the same tension absent the application of an external load.

As shown in FIG. 12, the guide rollers 162, 164 are displaced to their neutral positions KN. As a result, the deflected springs 166 are preloaded and apply a persistent spring force or preload to the tendon cables 156, 158 tending to pull the tendon cables 156, 158 in the proximal direction. In the neutral position, the finger 100 assumes a prescribed pose as shown in FIG. 12 and discussed below. The persistent preload tension on the tendon cables 156, 158 acts to exert an axially compressive force on the phalanxes 110-116 and the vertebrae V1-V6.

From the neutral position of the finger 100, the phalanxes 112-116 can bend about the pivot axes PP-PP, PM-PM, PD-PD at the knuckle joints JP, JM, JD in both a closing direction MC and an opening direction MO (FIG. 12).

In order to bend the finger 100 in the closing direction MC, the spool 154 is driven by the actuator 152 to rotate in the counterclockwise direction R2. As a result, the inner tendon cable 156 is wound onto the spool 154 and the outer tendon cable 158 is payed out from the spool 154 so that the length of the inner tendon cable 156 (between the spool 154 and the pin 149) is reduced and the length of the outer tendon cable 158 (between the spool 154 and the pin 149) is increased. The springs 166 continue to be deflected and exert positive tension on the tendon cables 156, 158. However, when the finger 100 encounters resistance (e.g., is exerting a force on an encountered object) or reaches its maximum closed position (as shown in FIG. 13), the tension on the inner tendon cable 156 will exceed that of its neutral position, and the tension on the outer tendon cable 158 may be less than that of its neutral position, so that the rollers 162, 164 are deflected to new positions KCI and KCO, respectively, as shown in FIG. 13.

Figure 14:
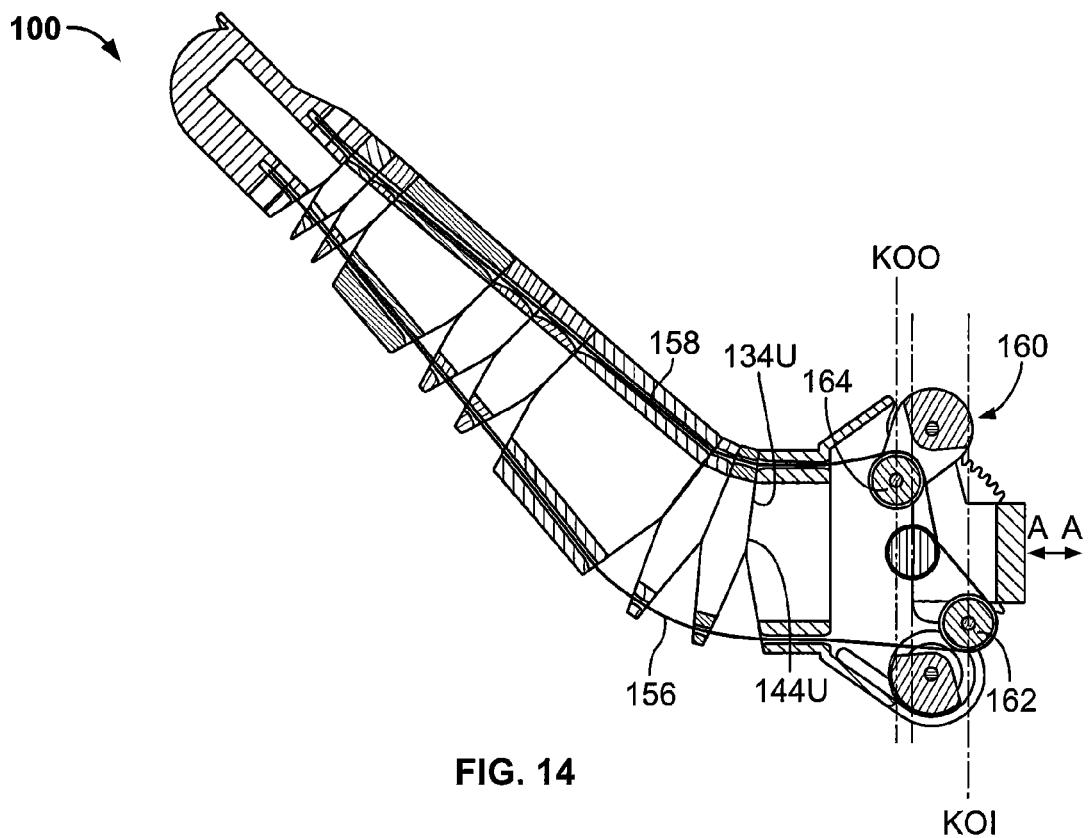
FIG. 14 is a cross-sectional view of the finger of FIG. 2 taken along the line 12-12 of FIG. 2, wherein the finger is shown in an open position.

In order to bend the finger 100 in the opening direction MO, the spool 154 is driven by the actuator 152 to rotate in the clockwise direction R1. As a result, the outer tendon cable 158 is wound onto the spool 154 and the inner tendon cable 156 is payed out from the spool 154 so that the length of the outer tendon cable 158 (between the spool 154 and the pin 149) is reduced and the length of the inner tendon cable 156 (between the spool 154 and the pin 149) is increased. The springs 166 continue to be deflected and exert positive tension on the tendon cables 156, 158. However, when the finger 100 encounters resistance (e.g., is exerting a force on an encountered object) or reaches its maximum open position (as shown in FIG. 14), the tension on the outer tendon cable 158 will exceed that of its neutral position, and the tension on the inner tendon cable 156 may be less than that of its neutral position, so that the rollers 162, 164 are deflected to new positions KOI and KOO, respectively, as shown in FIG. 14.

According to some embodiments, the tendon cables 156, 158 are relatively lightly preloaded by the tensioning system 160 in the neutral position. The springs 166 have a progressive spring force/spring deflection curve so that when the finger 100 encounters resistance and the roller 162, 164 of the pulling tendon cable 156 or 158 is displaced, the load on that tendon cable gradually increases or ramps up. Once the associated roller 162, 164 is fully extended (i.e., has been deflected to its forwardmost available position), the full tendon force will be exerted independent of the spring 166. That is, when the swingarms 162A, 164A are deflected away from the distal end 110B of the finger 100, the tension in the tendon cables 156, 158 is dictated by the spring preload. However, as the tendon tension increases, the swingarms 162A, 164A are pulled towards the distal end 110B and slowly transition the tension from the spring 166 to the structure of the housing 110B. For example, even if the spring 166 were omitted, the maximum tendon tension would still be supported as the swingarms 162A, 164A become effectively two-force members.

Thus, both movement and restoring force are provided via the tendon cables 156, 158. The tensioning system 160 and the tendons 156, 158 serve as a suspension system for the finger 100. The tensioning system 160 can ensure that the tendon cables 156, 158 are maintained taut and do not acquire slack throughout the intended range of motion of the finger 100. In some embodiments, the tensioning system 160 maintains a positive tension on the tendon cables 156, 158 at all times.

According to some embodiments, the preload force on the tendon cables 156, 158 in the neutral position is in the range of from about 3 lbs to 10 lbs. Higher preloads may be achieved using stronger springs; however, tendon life is extended or maximized by minimizing the nominal preload.

As discussed above, the finger 100 bends at the knuckle joints JP, JM, JD. The knuckle joints JP, JM, JD can thus provide hinge-like movement between the phalanxes 110-116. The flexible coupling by the guide members 118 and the tendon cables 156, 158 permits the adjacent bearing surfaces 132A, 132B, 142A, 142B of the phalanxes 110-116 and the vertebrae V1-V6 to rotate, roll or pivot relative to one another. The positioning of tendon cables 156, 158 and the preferential bending shape of the guide members 118 inhibits relative displacement between the phalanxes and vertebrae out of the prescribed bending plane (i.e., the plane normal to the pivot axes PP-PP, PM-PM, PD-PD).

The axially compressive loading by the tensioning mechanism 160 tends to maintain the adjacent bearing surfaces 132A, 132B, 142A, 142B in contact with one another throughout the rolling movement. The guide members 118 laterally and rotationally center the vertebrae and phalanxes of each knuckle joint. The guide members 118 are able to slide in and out of the guide member slots 126, 146 as the distance between the phalanxes and the vertebrae vary through the finger's range of motion. In this manner, the guide members 118 can accommodate the free movement of the phalanxes and the vertebrae while still providing guidance and stability to the phalanxes and the vertebrae.

The lengths of the guide members 118 and the depths of the slots 126 (and thereby the insertion depths of the guide members 118 into the slots 126 and the range of movement therein) are selected to ensure that throughout the range of motion of the finger 100 the ends 118A of the guide members 118 will not pull fully out of their slots 126. According to some embodiments, the guide members 118 do not significantly stretch axially throughout the range of motion of the finger 100.

In some embodiments and as illustrated, the finger 100 is shortest when each joint JP, JM, JD is in its neutral state (FIG. 12), and the guide member slots 126, 146 should be sufficiently deep that the guide members 118 do not "bottom out" guide member slots 126, 146 while in this state. As the joint JP, JM, JD deflect, the finger 100 lengthens, thus requiring that the guide members 118 be able to slide relative to the phalanxes and vertebrae.

Because the loads on each joint JP, JM, JD increase from the distal end to the proximal end, the required cross-section of the guide members 118 also increases. In some embodiments and as illustrated, the guide members 118 of each joint increase from the distal joint JD to the proximal joint JP.

In other embodiments, each guide member 118 may be affixed to one (and only one; i.e., exactly one) of the finger joint components, either one of the phalanxes 110-116 or one of the vertebrae V1-V6 forming a part of the respective joint, as long as the guide member 118 can still slide relative to the remaining joint components. In embodiments, each guide member 118 may be molded integral to one of the finger joint components, one of the phalanxes 110-116 or one of the vertebrae V1-V6 forming a part of the respective joint, to further reduce cost and assembly labor.

According to further embodiments, two or more (e.g., all) of the guide members 118 that run the length of the finger 100 on a given side may be combined into a single molded part constituting a multi joint guide member. This multi joint guide member may decrease in cross-section as it extends from the proximal end towards the distal end of the finger 100. This multi joint guide member may be affixed to or molded integrally with one of the finger joint components (i.e., one of the phalanxes 110-116 or one of the vertebrae V1-V6) or may be held captive in guide member slots in the same manner as the guide members 118.

During an "overload" event, the joints JP, JM, JD may be pulled even further apart than they will be during their standard range of motion. The lengths of the guide members 118 should be sufficient to accommodate this amount of separation so that the joints JP, JM, JD can be separated yet still reseat when the overload is relieved.

Referring to FIG. 12, it can be seen that in the illustrated neutral position the mating faceted bearing surfaces 132A, 132B, 142A, 142B of each of the phalanxes 110-116 and the vertebrae V1-V6 engage each other at their respective midsections 134M, 144M. The geometries of the bearing surfaces 132A, 132B, 142A, 142B and the lengths of the tendon cables 156, 158 are configured to achieve this finger configuration when the tendon cables 156, 158 are adjusted to the neutral position lengths and no external force or resistance is applied. Notably, gaps are present between the opposing bearing surfaces 132A, 132B, 142A, 142B both above and below their mating points.

With reference to FIG. 13, when the spool 154 is rotated in the counterclockwise direction R2 to close the finger 100, the bearing surfaces 132A, 132B, 142A, 142B will roll counterclockwise about one another to reduce the lower gaps, thereby curling the phalanxes 110-116 and the vertebrae V1-V6 downwardly or inwardly. The finger 100 may be curled inwardly in this manner until the opposing lower sections 134L, 144L of the bearing surfaces abut and act as mechanical stop faces that prevent or limit further rotation. The proximal joint JP will bend before the middle joint JM and the distal joint JD and will reach its maximum position before the joints JM, JD bend unless the finger encounters an external force or object.

With reference to FIG. 14, when the spool is rotated in the clockwise direction R1 to open the finger 100, the bearing surfaces 132A, 132B, 142A, 142B will roll clockwise about one another to reduce the upper gaps, thereby curling the phalanxes 110-116 and the vertebrae V1-V6 upwardly or outwardly. The finger 100 may be curled outwardly in this manner until the opposing upper sections 134U, 144U of the bearing surfaces abut and act as mechanical stop faces that prevent or limit further rotation. Again, the proximal joint JP will bend to its maximum position prior to displacement of the joints JM, JD unless the finger encounters an external force or object.

The prescribed geometries of the phalanxes 110-116 and the vertebrae V1-V6, including their bearing surfaces 132A, 132B, 142A, 142B, will determine, prescribe, set or dictate the shape of the finger 100 at any given position in its range of movement. The selection or modification of these geometries can be used to design or tune the performance of the finger 100. The geometries may be selected to determine a shape of the finger 100 and/or a bending sequence. For example, the finger 100 may be redesigned to assume a less tight position when fully closed. In the illustrated configuration, when the spool 154 is rotated to close the finger 100, the finger 100 will bend first at the proximal knuckle joint JP and then at the knuckle joints JM, JD after the finger 100 has reached the limit of the proximal joint JP or the finger encounters an external force or object. Due to inherent frictional losses in the tendons 156, 158, it may only be possible to approximately control the shape of the finger 100, as it moves through its range of motion. This shape may also differ depending on the direction the finger 100 is moving.

Figure 7:
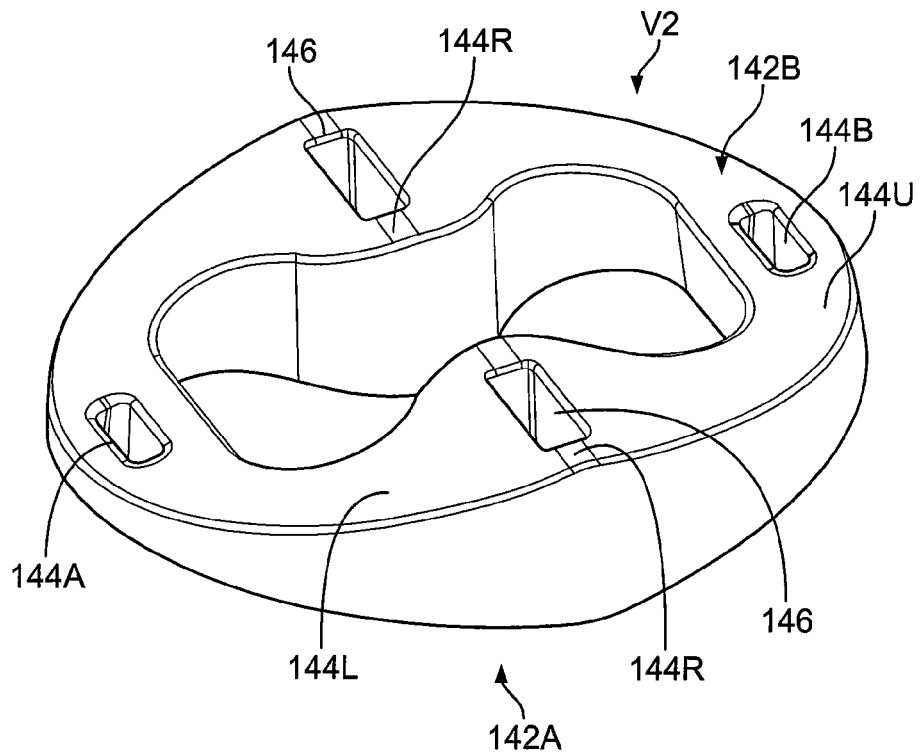
FIG. 7 is front perspective view of a vertebra forming a part of a proximal knuckle joint of the robotic finger of FIG. 2.

The proximal vertebrae V1, V2 do not have distinct flat faces between the respective inner and outer sections 144U, 144L. This allows the proximal joint JP to act in a simple hinge-like manner such that the proximal joint JP swings through its entire range of motion while the more distal joints JM, JD remain in their neutral positions. In some embodiments and as illustrated in FIG. 7, each bearing surface 142A, 142B of the proximal vertebrae V1, V2 has a rounded transition corner or surface 144R between its inner and outer sections, or stop faces, 144L, 144U that allows the vertebrae V1, V2 and associated phalanx bearing surfaces 132A, 132B to roll on one another.

Figure 8:
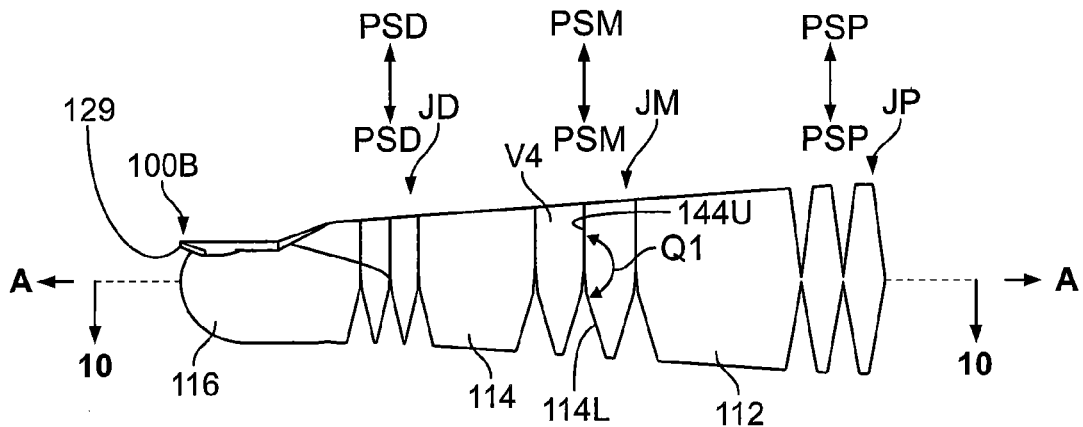
FIG. 8 is a fragmentary, side view of the finger of FIG. 2.
Figure 9:
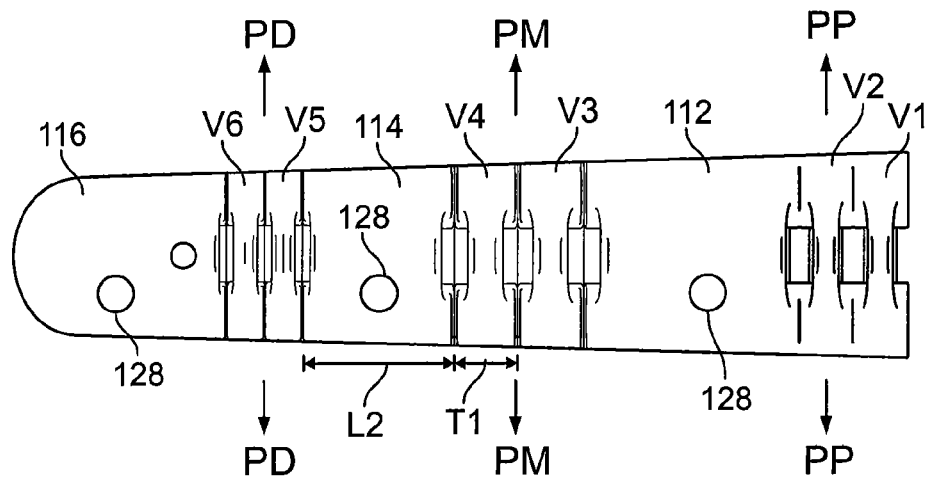
FIG. 9 is a fragmentary, bottom view of the finger of FIG. 2.

In some embodiments and as shown in FIG. 8, the inner section 144L and the outer section 144U of each vertebra V1-V6 are disposed at an oblique angle Q1 with respect to one another. The central or midsection 144M of each vertebra V3-V6 is disposed at an oblique angle to the sections 144L and 144U of the vertebra.

In some embodiments and as shown in FIG. 12, when the knuckle joints JM, JD are extended to their neutral positions, the opposing inner sections 144L of the vertebrae V3-V6 are disposed at angles Q2 with respect to one another. According to some embodiments, each angle Q2 is in the range of from about 25 to 35 degrees.

In some embodiments and as shown in FIG. 13, when the knuckle joint JP is in its neutral position, the opposing inner sections 144L and opposing outer sections 144U of the vertebrae V1, V2 are disposed at an angle Q3 with respect to one another. According to some embodiments, each angle Q3 is in the range of from about 15 to 25 degrees.

Each of the vertebrae V1-V6 has an axial thickness T1 (FIG. 4) extending along the finger axis A-A, and a lateral width W1 (FIG. 5) extending perpendicular to the finger axis A-A. The lateral width W1 of each vertebra V1-V6 is greater than its axial thickness T1.

According to some embodiments, the lateral width W1 of each vertebra V1-V6 is at least 1.5 times its axial thickness T1, in some embodiments, at least 2 times its axial thickness, and, in some embodiments, in the range of from about 2 to 5 times its axial thickness T1. In embodiments, the ratio of lateral width W1 to axial thickness T1 increases by a factor of at least 1.25 for each knuckle joint JP, JM, JD in a direction ascending from the proximal end 100A of the finger 100.

Referring to FIG. 4, the thinnest part of the vertebra (as its bottom or inner edge) must be thick enough to maintain the strength necessary to support the peak tendon loads without failing; the angles of the lower surfaces (144L) then dictate how thick the vertebra becomes as it thickest end. Increasing the number of vertebrae in a given joint decreases the angle of surfaces 144 and thus also decreases the maximum thickness T1. In embodiments, each finger joint JP, JM, JD includes at least two vertebrae and the axial thickness T1 ranges from 2 to 6 times larger than the thinnest part of the vertebra. In embodiments, axial thickness T1 is four times larger than the axial thickness T8 (FIG. 4) of the thinnest part 144I of the vertebra V4 and each lower surface 144L is angled inward at a slope or angle Q5 (FIG. 4) in the range of 30 to 55 (e.g., 35, 40, 45, 50) degrees from the plane of the adjacent upper surface 144U.

The axial length L2 (FIG. 9) of each phalanx 112-116 is greater than the axial thickness T1 of each vertebra V1-V6. According to some embodiments, the axial length L2 of each phalanx 112-116 is at least 2 times the axial thickness T1 of each adjacent vertebra V1-V6 and, in some embodiments, in the range of from about 2 to 4 times the axial thickness T1 of each adjacent vertebra V1-V6. The main constraint on the length L2 of each phalanx 110-116 is the desired overall length of the finger 100. By reducing the axial thicknesses T1 of the vertebrae V1-V6, the axial lengths of the knuckle joints JP, JM, JD can be reduced or minimized, thereby permitting longer phalanxes 110-116. Longer phalanxes are desirable in order to provide adequate room thereon to accommodate sensors.

According to some embodiments, at least some of the vertebrae V1-V6 have different the axial thicknesses T1 from one another. In some embodiments, the axial thicknesses T1 of the vertebrae V5, V6 are less than the axial thicknesses T1 of the vertebrae V3, V4.

Each of the vertebrae V1-V6 has a height H1 (FIG. 4) perpendicular to each of its axial thickness T1 (FIG. 4) and its lateral width W1 (FIG. 5), and the axial thickness T1 varies across the height H1 of the vertebra. For example, as can be seen in the side elevational view of FIG. 4, the axial thickness T1 of the vertebra V4 varies from the inner or lower end of the vertebra V4 to the outer or upper end of the vertebra V4. The lower section of the vertebra V4 (i.e., between the sections 144L) is tapered or wedge-shaped and thus has a constantly varying or non-uniform axial thickness and the upper section (i.e., between the sections 144U) is substantially uniform in axial thickness.

The provision of multiple vertebrae V1-V6 allows for larger joint angles to be achieved, for smaller gaps between the vertebrae for a given joint angle (which creates smaller pinch points), and more gradual tendon paths when the finger is fully deflected.

By providing multiple vertebrae in each knuckle joint, the minimum bend radius assumed by each tendon cable 156, 158 can be reduced. For example, with reference to FIG. 13, in the fully closed position the vertebrae V3, V4 introduce steps across the knuckle joint JM that are spanned by sections of the tendon cable 156, which are arranged at relatively large angles to one another. In the absence of the vertebrae V3, V4, the tensioned tendon cable 158 would extend straight from the phalanx 114 to the phalanx 116 with tight angle bends where the tendon cable 158 exits the phalanxes 114, 116. This improved cable management can extend the service lives of the tendon cables, reduce friction binding, and provide smoother bending movement of the finger. Enabling a gradual and non-vibrational bending of the finger allows a robot hand having more than one of these fingers to carefully align with and position around breakable or easily spilled objects (like coffee cups and jugs of milk) for secure lifting without spillage or breakage.

The tensioning system 160 and the vertebrae V1-V6 can provide several additional advantages or beneficial performance characteristics in use.

As discussed above, the tensioning system 160 allows the tensions in the tendon cables 156, 158 to smoothly transition from a predetermined preload (dictated by the selected spring 166) to a state where infinite or unlimited tension (up to the tension capacity of the tendon cable, short of breakage) can be achieved on the tendon cable regardless of the initial preload. Accordingly, the tendon cables 156, 158 ultimately exert the full force of the actuator 152 but only a relatively small initial preload tension need be provided on the tendon cables 156, 158 to prevent the tendon cables 156, 158 from ever becoming slack in the operating range. This lower preload tension in the neutral position and for light loads can reduce tendon cable stretch and minimize tendon cable friction to extend the service life of the tendon cables. Minimizing tendon cable friction reduces the energy and output capacity requirements for the actuator 152.

The tensioning system 160 accommodates stretch of the tendon cables 156, 158 over time. The tensioning system 160 eliminates the need for a manual tensioning mechanism, thereby eliminating the risk of manual error and reducing service costs.

In embodiments in which the overall tendon length is variable, the tensioning system 160 accommodates tendon cable paths that are not equal length over the range of motion. The tensioning system 160 and drive system 150 allow for equal bidirectional performance so that either tendon 156, 158 can be activated depending on the direction of motion desired. The tensioning system 160 does not require the spool 154 to float. The tensioning system 160 can thus allow greater flexibility in the design of the drive system and a smaller form factor.

The tensioning system 160 and the vertebrae V1-V6 also enable the finger 100 to absorb external forces, impacts or shocks without damage. For example, with reference to FIG. 15, when an upward force IU is incident on the finger 100 tending to force the finger open, the force is absorbed by the spring 166 of the roller 162. The roller 162 is thereby deflected to an extended position KUI. Additionally, the roller 164 is pulled back to a retracted position KUO by its spring 166, thereby preventing slack in the tendon cable 158. When the external force is released, the spring 166 of the roller 162 will force the rollers 162, 164 and the finger 100 back to their original positions. Notably, the tendon tension never encounters an "step-change" in tension (like would happen if the tensioner were to encounter a mechanical stop) which can lead to catastrophic failure of the tendon. The physics of the tensioning system 160 gradually increase the tendon tension from the spring preload up to whatever force is necessary to counter the load.

Figure 16:
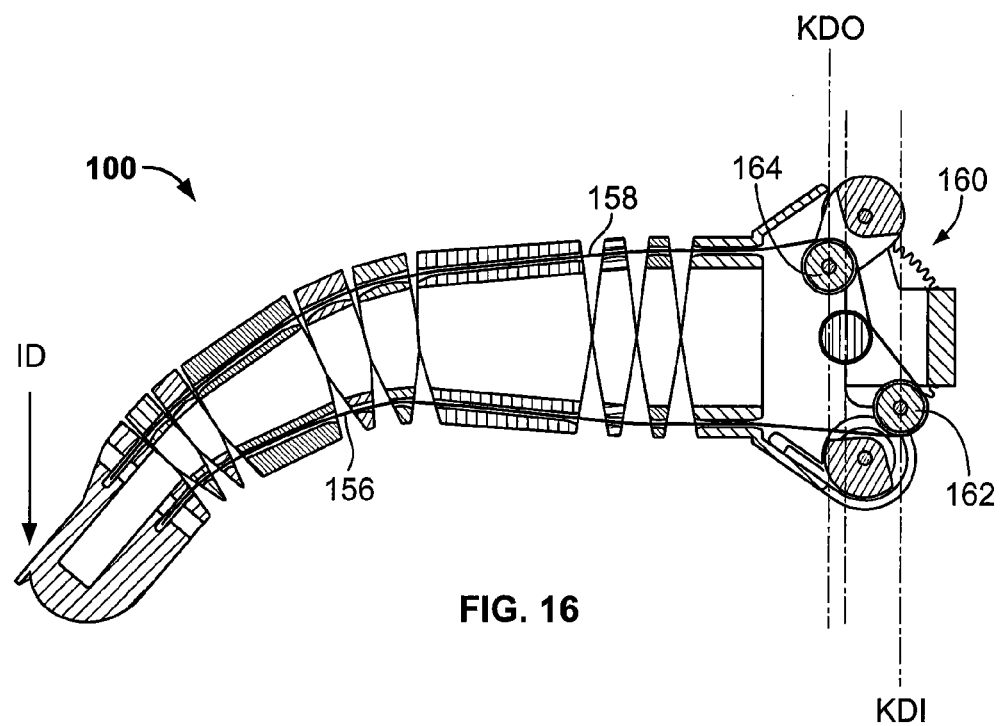
FIG. 16 is a cross-sectional view of the finger of FIG. 2 taken along the line 12-12 of FIG. 2, wherein the finger is shown overloaded by a downward external load.

Similarly, with reference to FIG. 16, when a downward force ID is incident on the finger 100 tending to force the finger closed, the force is absorbed by the spring 166 of the roller 164. The roller 164 is thereby deflected to an extended position KDO. Additionally, the roller 162 is pulled back to a retracted position KDI by its spring 166, thereby preventing slack in the tendon cable 156. When the external force is released, the spring 166 of the roller 164 will force the rollers 162, 164 and the finger 100 back to their original positions.

Figure 17A:
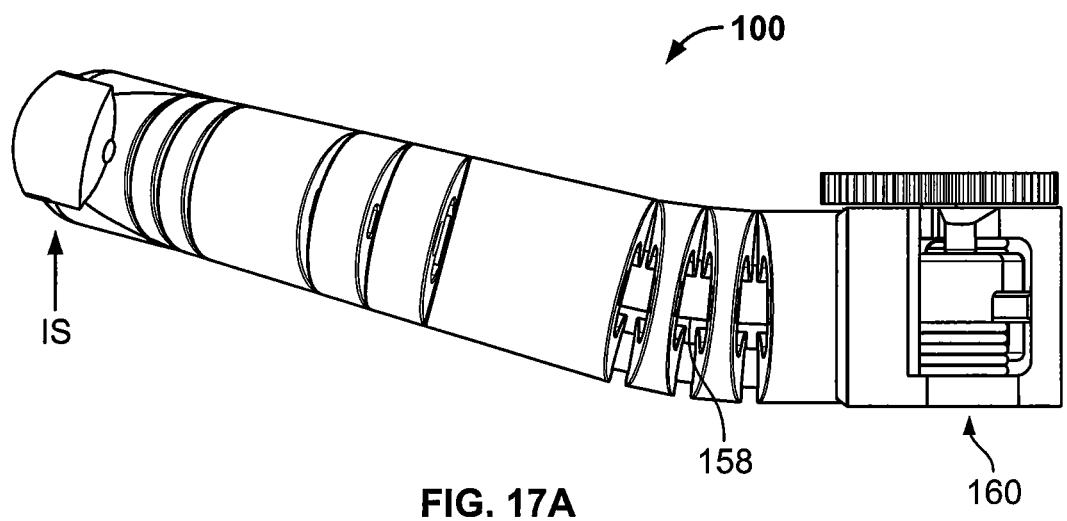
FIG. 17A is a top view of the finger of FIG. 2 wherein the finger is shown overloaded by a sideward external load.

The tensioning system 160 can also accommodate laterally directed external loads. With reference to FIG. 17A when a sideward or lateral force IS (e.g., into or out of the plane of the paper in FIG. 17) is incident on the finger 100 tending to force the finger to bend sideways about bend axes PSP-PSP, PSM-PSM, and/or PSD-PSD (FIG. 8), the force is absorbed by the springs 166 of both the roller 162 and the roller 164. The rollers 162, 164 are thereby deflected to extended positions KS. When the external force is released, the springs 166 will force the rollers 162, 164 and the finger 100 back to their original positions.

The tensioning system 160 can be particularly beneficial when the external force is a shock, impact force or impulse load. In this case, the springs 166 can absorb, damp, dissipate or ramp the impact load to protect the tendon cables or other components of the finger 100. The tensioning system 160 provides overload protection (such as from an impact) by ramping tension in the tendon cables up to full capacity, as opposed to creating a step change in the tension. By providing this overload protection, the tensioning system 160 can permit the use of tendon cables 156, 158 that themselves have very little give or elasticity. The tensioning system 160 will maintain the tendon cables 156, 158 taut so that the impact does not induce slack in the tendon cables.

Figure 6:
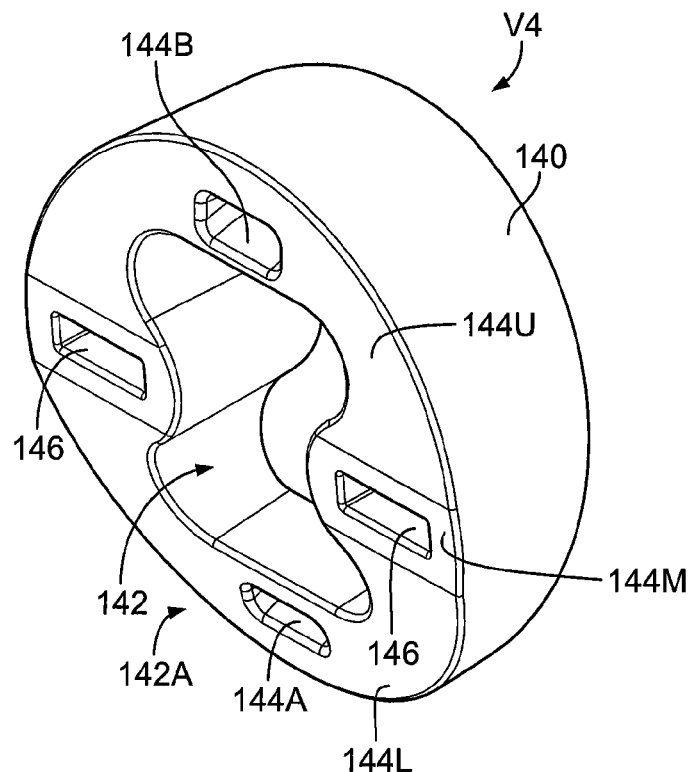
FIG. 6 is rear perspective view of the vertebra of FIG. 4.

The tensioning system 160 and knuckle joints JP, JM, JD can also accommodate torsional loads and impacts on the finger 100, such as forces tending to twist or rotate the phalanxes 110-116 about the finger axis A-A relative to one another. Because the guide members 118 and tendon cables 156, 158 are compliant and axially extendable by displacement of the rollers 162, 164 and the phalanxes 110-116 and vertebrae V1-V6 are not rigidly coupled, the phalanxes 110-116 and vertebrae V1-V6 can rotate on their bearing surfaces 132A, 132B, 142A, 142B. The degree of torsional compliance can be determined by selection of the geometry of the bearing surfaces 132A, 132B, 142A, 142B and/or the openings of the raceways 124A, 124B, 144A, 144B (FIGS. 3, 6 and 7) and/or the guide member slots 126, 146 (FIGS. 3, 6 and 7).

The torsional compliance may be different for different knuckle joints JP, JM, JD or for different parts within a knuckle joint. For example, the knuckle joint JM may be configured to provide a greater range of torsional compliance than the knuckle joint JP by making the openings of the raceways 124A, 124B, 144A, 144B and/or the guide member slots 126, 146 of the knuckle joint JM larger and more rounded (e.g., funnel shaped) than the openings of the raceways 124A, 124B, 144A, 144B and/or the guide member slots 126, 146 of the knuckle joint JP. Such an arrangement may be desirable for executing a pinching grip maneuver using the finger 100. According to some embodiments, the knuckle joints JM and JD each have a torsional compliance (to the point of maximum extension of the tensioning mechanism 160) in the range of from about +/−10 degrees to +/−35 degrees from the neutral position. The amount of torsional compliance in each knuckle joint can be increased by providing the knuckle joint with more vertebrae. On the other hand, if reduced or zero torsional compliance is desired, cooperating shear key features can be added to the mating surfaces of the vertebrae to limit or prevent any torsional displacement.

As discussed above, the tensioning mechanism 160 transitions tendon tension from being determined by the springs 166 to being completely countered by the rigid structure of the housing 110B. This transition will occur both when the finger 100 is driven and reaches its limit (e.g., fully open position (FIG. 14) or fully closed position (FIG. 13A)) or encounters an external object or force, and when the finger 100 is loaded by an external force or impact (e.g., an overload impact as illustrated in FIGS. 15, 16, 17A and 17B). In these events, above a threshold tension, the swingarms 262A, 264A will assume a maximum load position or two-force member position.

Figure 13B:
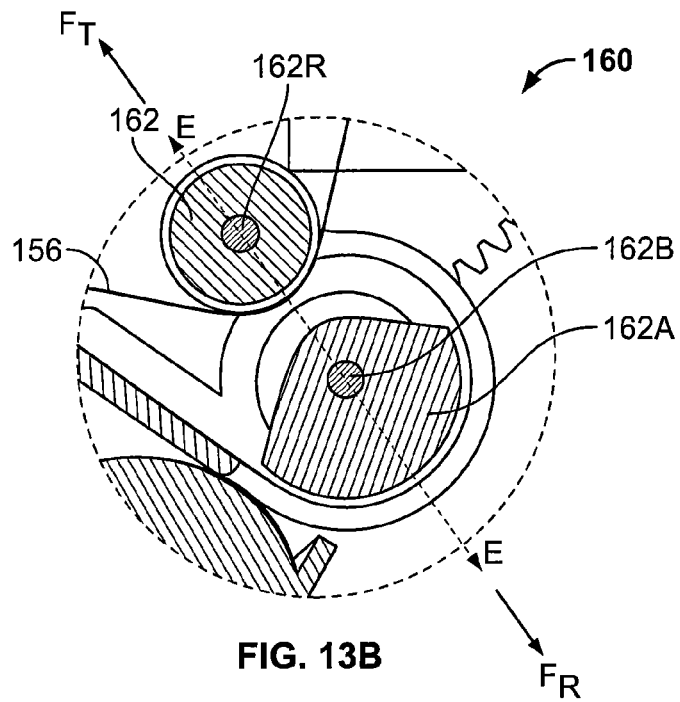
FIG. 13B is an enlarged detail view of area 13B designated in FIG. 13A.
Figure 17B:
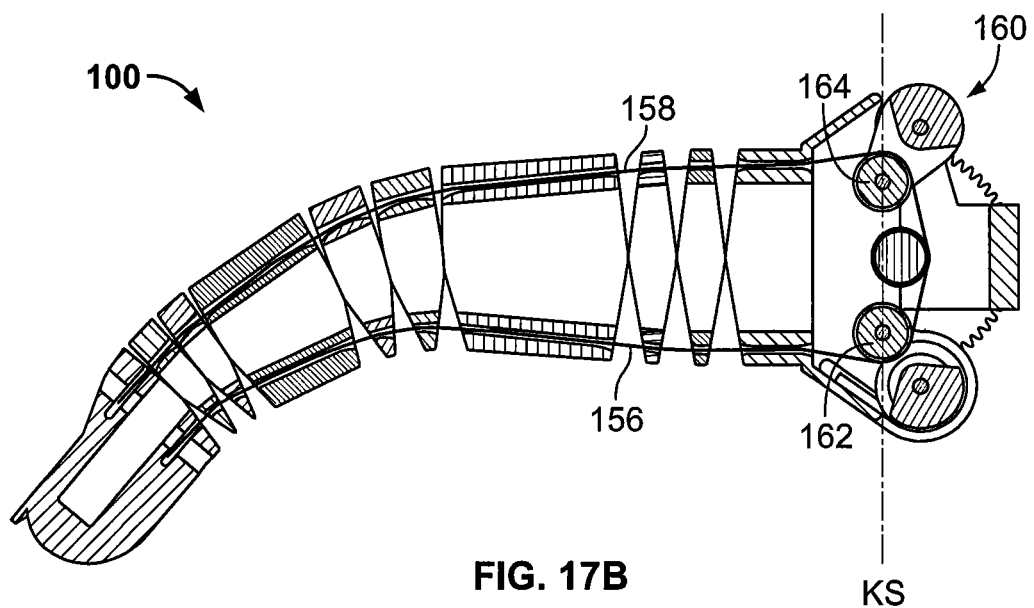
FIG. 17B is a cross-sectional view of the finger of FIG. 2 taken along the line 12-12 of FIG. 2, wherein the finger is shown overloaded by the sideward external load.

For example, in FIGS. 13A, 15 and 17B, the swingarm 262A is shown in its maximum load, fully extended, or two-force member position. In FIGS. 14, 16 and 17B, the swingarm 264A is shown in its maximum load, fully extended, or two-force member position. FIG. 13B is an enlarged detail view of the swingarm 162A in its maximum load position. In the maximum load position, the swingarm 162A is positioned ("fully extended") such that the associated tendon cable 156 has adopted its shortest possible path from the spool 154 to the exit port of the chamber housing the swingarm 162A. Any additional tension on the tendon cable 156 is therefore applied directly to the housing 110B through the swingarm pivot 162B and along an axis E-E defined by the roller pivot 162R and the swingarm pivot 162B. Additional tension cannot be transferred to the spring 166 because the geometry of the tensioning system 160 does not permit further rotation of the swingarm 162A. In this position, the tension force $F_T$ applied to the roller 162 by the tendon cable 156 and the reaction force $F_R$ extend coaxially along the axis E-E through the pivots 162B, 162R. It will be appreciated that the tension force $F_T$ is the resultant force from or combination of the forces applied by the two tendon cable segments extending from either side of the roller 162.

In the maximum load position, the swingarm 162A effectively becomes a two-force member in that any additional cable tension does not alter the equilibrium position of the swingarm 162A. The tendon forces result in a pure tension load being applied to the swing-arm 162A (assuming the force applied by the spring 166 is negligible by comparison).

As the finger 100 is returned to its centered position by the tensioning system 160, the guide members 118 can help guide the phalanxes and vertebrae into their corresponding positions. The phalanxes and vertebrae may slide along the guide members 118 like beads on a string. The lengths of the guide members 118 and the depths of the slots 126 (and thereby the insertion depths of the guide members 118 into the slots 126 and the range of movement therein) are selected to ensure that throughout the range of permitted displacement of the finger 100 the ends 118A of the guide members 118 will not pull fully out of their slots 126. That is, throughout the range of movement of the finger 100, the guide member ends 118A of each guide member 118 remain slidably captured in their slots 126 and the length of the guide member 118 extending between the two slots 126 can vary to accommodate relative displacement between the bearing surfaces 132A, 132B, 142A, 142B within which the two slots 126 are formed.

The tensioning system 160 in combination with the vertebrae V1-V6 can provide enhanced or additional flexibility and overload protection for the finger 100 and the actuator 152. Each of the vertebrae V1-V6 provides an additional, passive degree of freedom that can be exploited by an applied force sufficient to displace one or both of the springs 166 (until the corresponding roller(s) 162, 164 is/are fully extended). The finger 100 is able to move a substantial amount and in a great many directions even though the lengths of the tendon cables 156, 158 (as measured from the spool 154 to the pin 149) remain fixed. The phalanxes and vertebrae can separate from one another and will be readily returned to their proper positions by the tensioning system 160 and the guide members 118.

According to some embodiments, the tensioning system 160 is configured to permit a maximum displacement of each tendon cable 156, 158 from its neutral position in the range of from about 4 to 8 mm.

According to some embodiments, the springs 166 each have a spring constant in the range of from about 0.02 to 0.04 in-lbs/degree.

In use, the sensor assemblies 172, 174, 176 can serve as contact or tactile sensors. As discussed above, the sensor system 170 employs a number of distinct spatial sensing sections or regions. The sensor system can thus be used to detect and distinguish between application of pressure or forces to each of these sections to provide improved, higher resolution tactile feedback for use in guiding and operating the end effector 10. The segregation of the trace pattern 184 into multiple discrete sensing zones can avoid or reduce stray currents through the bulk of the conductive layer 186. The sensor system 170 can also provide feedback indicating the magnitude and/or area of the applied force.

With reference to FIGS. 18-22, operation of the sensor assembly 176 will now be described. However, it will be appreciated that this description likewise applies to the sensor assemblies 172, 174.

With reference to FIG. 22, when a sufficient force F is applied to the cover 148 over the sensor 176A, for example, in the sensing region E1, the cover 148 and conductive layer 186 are thereby deflected or deformed toward the inner surface 180A. The inner surface 186A of the conductive layer 186 makes contact with and bridges the conductive traces C1 and CG. The traces C1, CG are thereby electrically connected to one another through the conductive layer 186, reducing the electrical resistance across the sensor circuit in zone E1 and the contact pads CP1 and CPC, and thereby the corresponding lead wires A1 and B. The remote receiver 171 is connected to the lead wires A1 and B and includes a suitable circuit to measure the resistance of the sensor circuit. For example, the remote receiver 171 may include a voltage divider circuit paired with an analog-to-digital convertor (ADC) and a power supply providing current to the sensor circuit.

According to some embodiments, the electrical resistance across the sensor circuit varies as a function of the applied force. The electrical resistance is proportional to the applied force. In particular, according to some embodiments, the sensors 176A-176D (and likewise the sensors 172A-172D and 174A-174D) are resistive sensors. As discussed above, in some embodiments, the conductive layer 186 is a semiconductor layer (e.g., VELOSTAT™ layer) having an inherent surface resistivity. The resistance through the conductive layer 186 is a function of the surface resistivity and the contact area. The resistance of each sensor 176A-176D will decrease in response to a greater magnitude of applied pressure. The resistance of the sensor 176A-176D may also decrease in response to a greater area of applied pressure. The decrease in resistance may result from a greater collective area of contact between the conductive layer 186 and the traces (e.g., traces C1 and CG) and/or a greater compressive deformation of the thickness of the conductive layer 186 (attributable to change in the bulk (volumetric) resistivity of the conductive layer 186).

The spacer 188 and the gap G formed thereby can provide performance advantages by providing an open circuit when no force is applied. The gap G can eliminate the incidence of an uncontrolled resistance at zero-force, which may occur when the conductive layer 186 is permitted to contact the traces C1, CG when no force is applied. In this way, the sensor assembly 176 can provide momentary switch action or response. After the gap G is closed, the resistance of the sensor circuit may vary as a function of the magnitude of the applied force so that changes in force can still be detected even after the momentary switch has been actuated. In some embodiments, the spacer 188 and the gap G may be omitted so that the sensor assembly 176 can more effectively detect small initial applied forces without the momentary on/off switch effect.

As discussed above, the sensor assembly 176 includes four sensors 176A-176D each corresponding to a respective sensing region E1-E4 and each having a respective trace C1-C4 and a common trace CG. By cycling through the contact pads CP1-CP4, the sensor assembly 176 serially samples or provides the remote receiver 171 with electrical resistances from each of the four sensors 176A-176O and sensing regions E1-E4.

The sensor assemblies 172, 174 may be used in the same manner as described above for the sensor assembly 176. Each sensor assembly 172, 174 may similarly include multiple sets of traces, multiple discrete sensors 172A-172D, 174A-174D and sensing regions, and a switching circuit that cycles through the sensors 172A-172D, 174A-174D. For example, the sensor assembly 172 may include two sensing regions (corresponding to sensing regions E1 and E2) in its midsections 172A and 172B, and two sensing regions (corresponding to sensing regions E3 and E4) in its side sections 172C and 172D. The sensor assembly 174 may be likewise constructed. By providing multiple, discrete sensing regions, the sensing system 170 can provide improved detection resolution.

Aspects of the finger 100 provide a number of advantages relating to cost and ease of manufacture. In general, the vertebrae, tensioning system 160 and sensor system 170 simplify the components and procedures required to construct the finger 100.

The tendon cables 156, 158 and guide members 118 are located in the radially outer portions of the phalanxes 110-116, leaving the central bores empty for routing sensor wiring.

The tendon cables 156, 158 form a part of the drive system 150 and the tensioning system 160, and also couple and maintain the relative positioning of the skeletal components, the phalanxes 110-116 and the vertebrae V1-V6. By using the tendon cables 156, 158 to effect motion drive, suspension and impact control, the layout and assembly of the finger 100 are simplified.

As described above, in embodiments, the sensor assemblies 172, 174, 176 are premounted on the phalanxes, and these subassemblies and the vertebrae V1-V6 and guide members 118 are serially stacked from the distal end to the proximal end. The tendon cables 156, 158 are threaded into the finger 100 and terminated. This modular assembly procedure is designed for execution with no special equipment or skill. Thus, the configuration and methods of the finger 100 enable more efficient and cost-effective construction.

As described above, in embodiments, each of the tendon cables 156, 158 includes two parallel strands 156B, 158B (FIG. 3) connected at a closed loop 156A, 158A at its distal terminal end (e.g., a single continuous strand is folded 180 degrees at the distal end) and secured by the pin 149. This dual strand tendon arrangement provides additional load capacity while evenly balancing the load between the two strands. The dual strands increase the push strength for insertion of the tendon cables 156, 158 into the raceways 124, 124B, 144A, 144B during assembly. The distal end of each tendon cable can be secured without cutting the tendon cable material, which cutting may otherwise cause fraying of the tendon cable that would interfere with assembly. The tendon cables 156, 158 are preterminated to the distal phalanx 116 and the spool 154 prior to installing the finger 100 on the base 20. The tendon cable paths are smooth and/or contoured to eliminate sharp corners.

The raceways 124A of the phalanxes 110-116 and the raceways 144A of the vertebrae V1-V6 collectively define or form an inner combined via or raceway 125A (FIG. 11) extending axially continuously the length of the finger 100 from the base member 110A to the distal phalanx 116. Likewise the raceways 124B and 144B collectively define an outer combined raceway 125B extending axially continuously from the base 110A to the distal phalanx 116. The tendons 156 and 158 extend continuously through the inner and outer combined raceways 125A and 125B, respectively. In embodiments, the raceways 125A, 125B each constitute a continuous smooth surface, even in the finger overload state where the joints JP, JM, JD are stretched apart. The openings of the raceways 124A, 124B, 144A, 144B are beveled or rounded to guide the tendon cables 156, 158 to bend and flex without hitting sharp corners.

Fingers and methods as disclosed herein can provide a number of advantages in operation, manufacture and cost reduction. As discussed above, the components of the finger 100 are conveniently and cost-effectively assembled by stacking.

The configuration and arrangement of the finger components leaves a relatively large central bore 135 through which the sensor system lead wires WP, WM, WD (and other parts if needed) are routed.

The sensor assemblies 172, 174, 176 are relatively thin and compact so that they are integrated with the finger without requiring substantial enlargement of the finger.

The use of the common trace CG for each sensor assembly 172, 174, 176 eliminates the need for a separate return (e.g., ground) wire for each of the sensors and sensing regions. This reduces the number of wires that must be routed from the PCB through the finger and therefore reduces the space required in the finger 100 to accommodate these wires. Because the finger has limited space to accommodate lead wires, this aspect can make possible the provision of multiple discrete sensors and sensing regions as described.

Notably, all of the electronic components of each sensor assembly 172, 174, 176 are located interior of the conductive layer 186 and the protective cover layer 148. Therefore, the conductive layer 186 and the optional protective cover layer 148 are the only moving parts of the sensor assembly.

Figure 23:
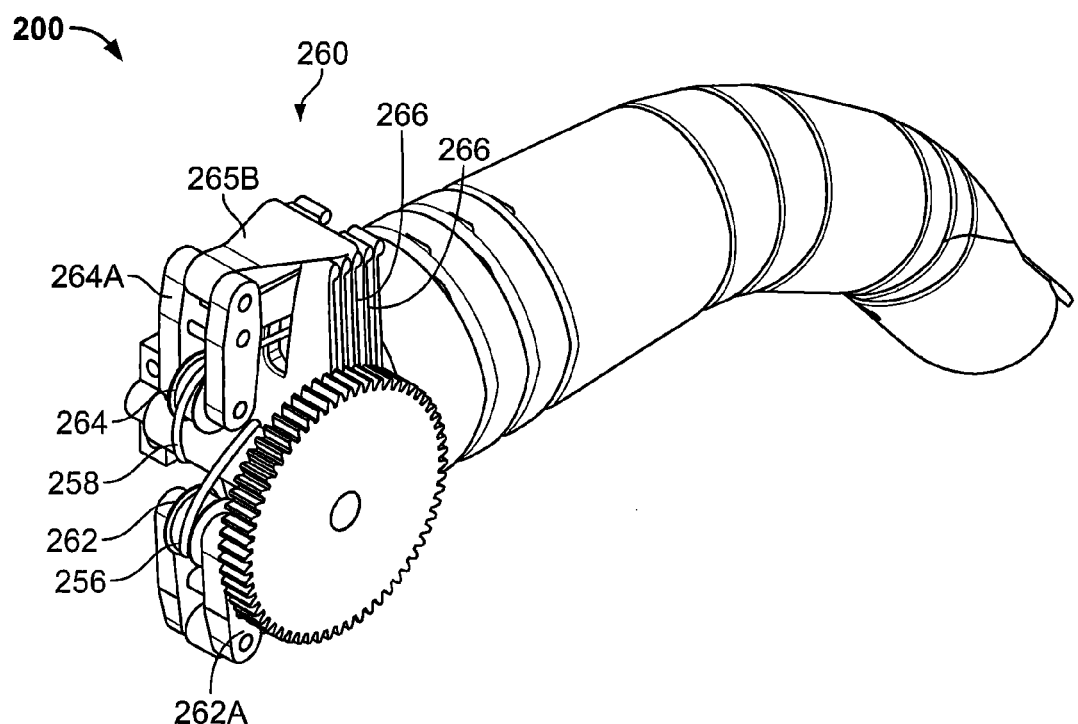
FIG. 23 is a rear perspective view of a robotic finger according to further embodiments of the invention.
Figure 24:
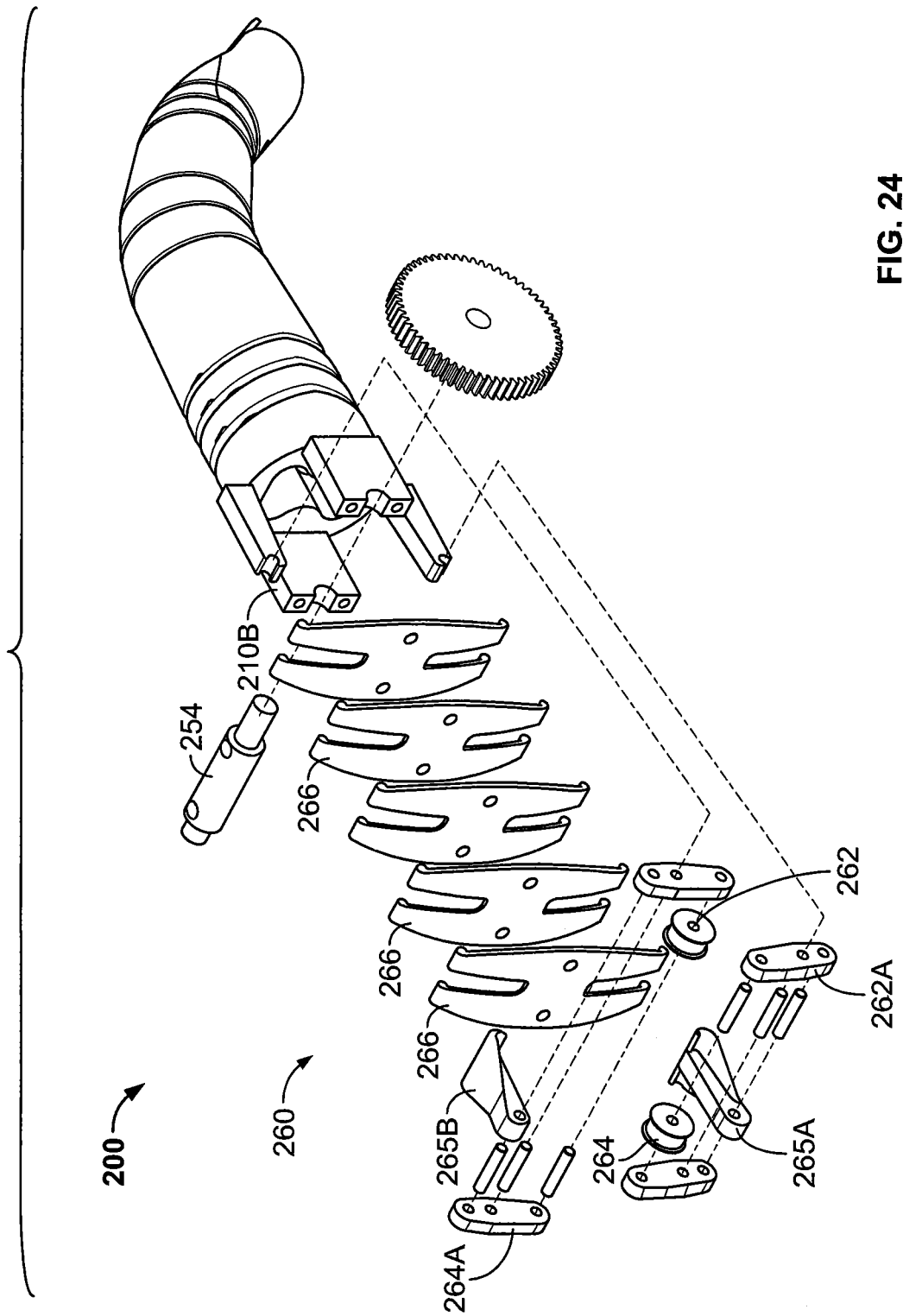
FIG. 24 is an exploded, rear perspective view of the robotic finger of FIG. 23.

With reference to FIGS. 23 and 24, a robotic finger 200 according to further embodiments of the invention is shown therein. The finger 200 corresponds to and may be constructed in the same manner as the finger 100, except that the finger 200 includes a tensioning system 260 in place of the tensioning system 160.

The tensioning system 260 includes an inner swingarm 262A pivotally mounted on a housing 210B by a pivot pin 262B. The tensioning mechanism 260 further includes an outer swingarm 264A pivotally mounted on the housing 210B by a pivot pin 264B. An inner guide roller 262 and an outer guide roller 264 are mounted on the swingarms 262A and 264A, respectively. Five stacked leaf springs 266 are connected in series between the swingarms 262A and 262B. In some embodiments, the leaf springs 266 are formed of a polymer such as a plastic material. An inner linkage 265A and an outer linkage 265B are provided between the leaf springs 266 and the inner swingarm 264A and the outer swingarm 264B to transmit the spring force of the leaf springs 266 to the guide rollers 262 and 264.

The tensioning system 260 is arranged such that, when the finger 200 is in its neutral position, the springs 266 are elastically deflected and bias or force the guide rollers 262 and 264 in the proximal direction to maintain a tension load on the tendon cables 256, 258 as described above with regard to the finger 100. In the neutral position, the springs 266, the linkages 265A, 265B and the guide rollers 262, 264 retain sufficient space to permit the guide rollers 262, 264 to travel in the distal direction in response to a load applied to the finger 200.

Figure 25:
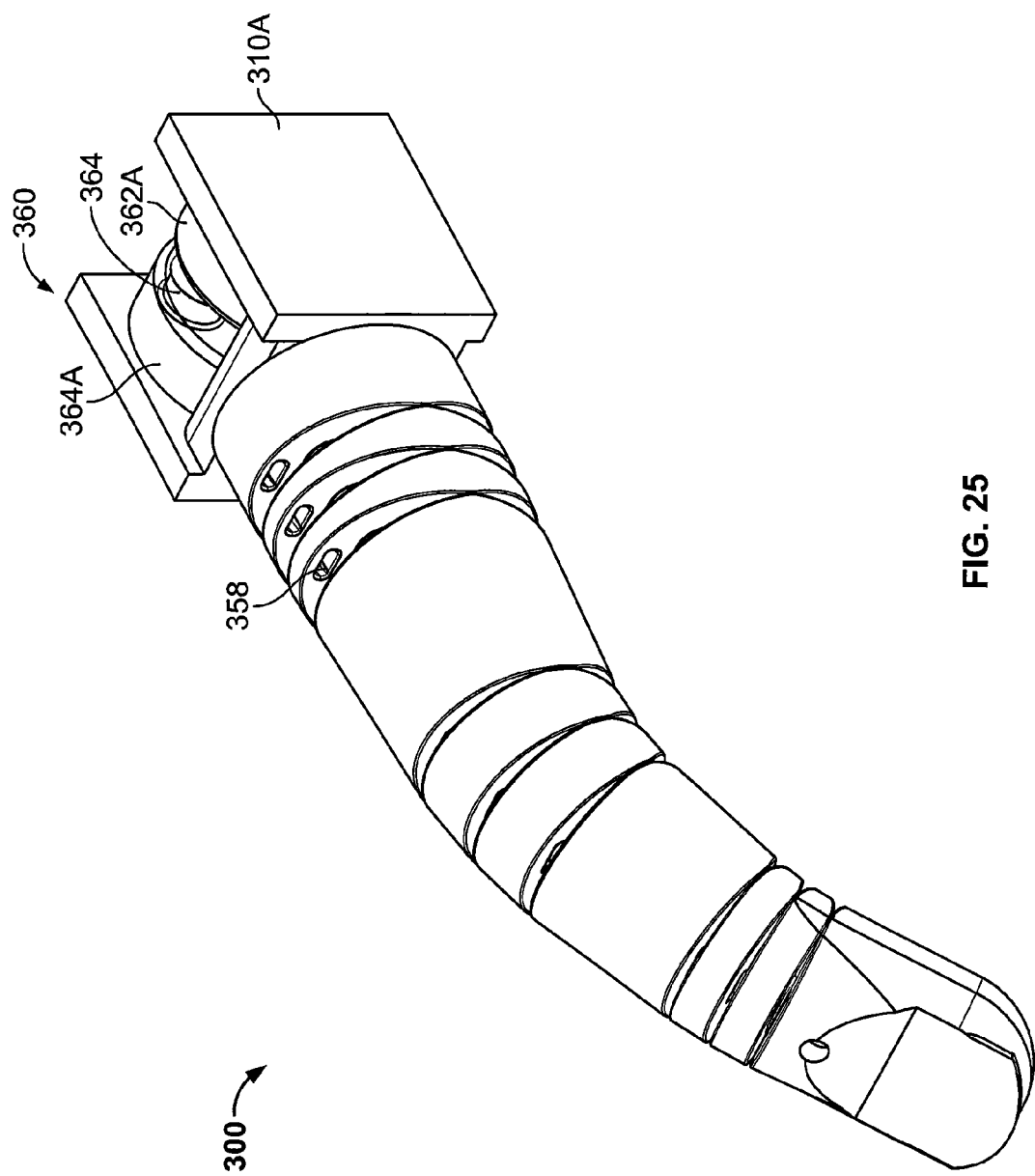
FIG. 25 is a front perspective view of a robotic finger according to further embodiments of the invention.
Figure 26:
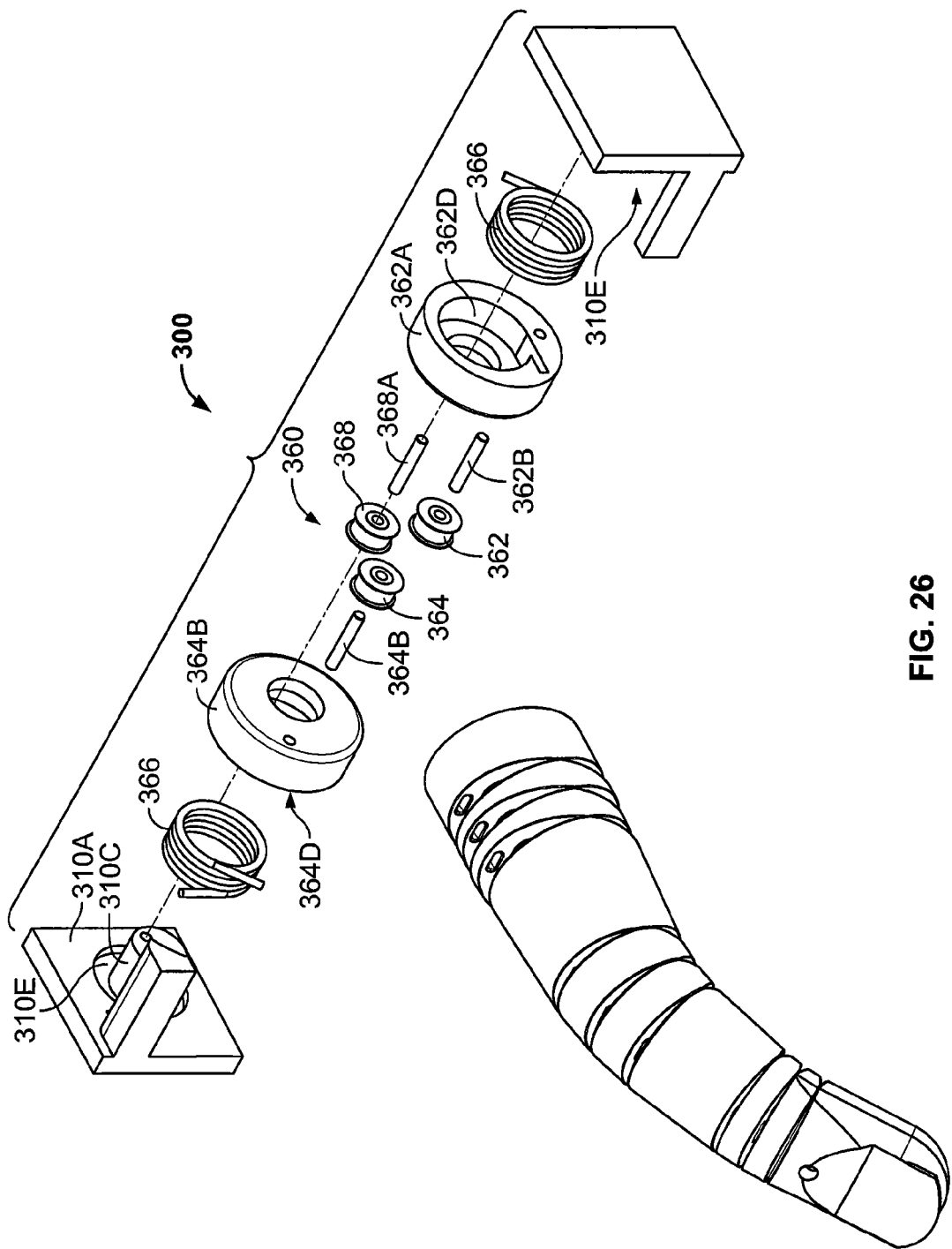
FIG. 26 is an exploded, front perspective view of the robotic finger of FIG. 25.
Figure 27:
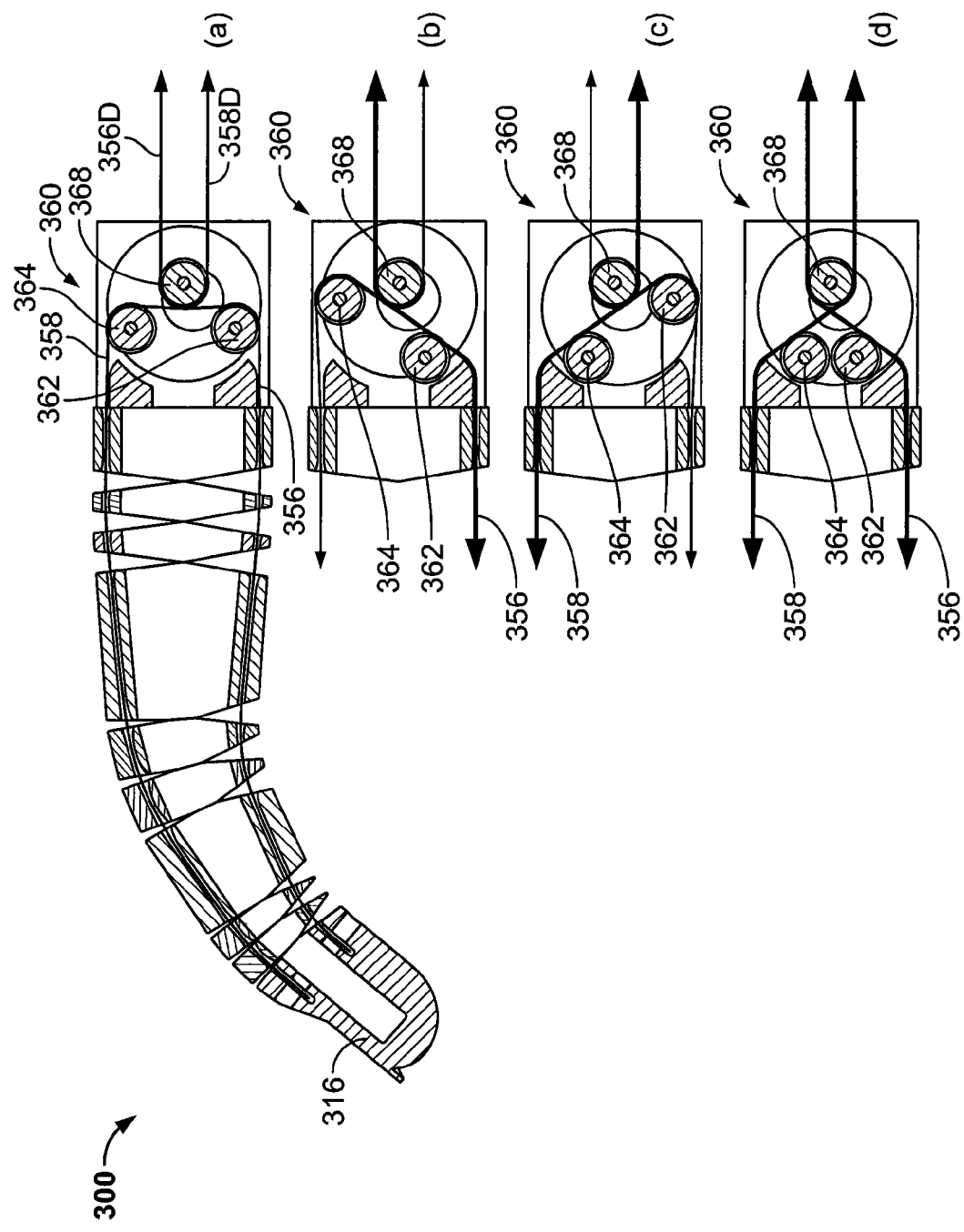
FIG. 27 is a cross-sectional view of the finger of FIG. 25 showing a tensioning system of the robotic finger in different operational positions.

With reference to FIGS. 25-27, a robotic finger 300 according to further embodiments is shown therein. The finger 300 corresponds to and may be constructed in the same manner as the finger 100, except that the finger 300 includes a tensioning system 360 in place of the tensioning system 160 and the drive spool and motor (not shown in FIGS. 25-27) is located off of the finger 300 (e.g., in the base 20).

The tensioning system 360 includes an inner swing arm or drum 262A rotatably mounted on a fixed post 310C of a housing 310B. The tensioning system 360 further includes an outer swing arm or drum 364A rotatably mounted on the post 310C. An inner guide roller 361, an outer guide roller 364 and a fixed guide roller 368 are disposed between the drums 362A, 364A. The inner guide roller 362 is rotatably mounted (by a pin 362B) on the drum 362A for travel therewith. The outer guide roller 364 is rotatably mounted (by a pin 364B) on the drum 364A for travel therewith. The fixed roller 368 is rotatably mounted on the post 310C by a pin 368B. The fixed roller 368 can rotate about the pin 368 but is otherwise fixed in position relative to the housing 310B. Torsion springs 366 are seated or housed in spring cavities 362A, 364D defined in the lateral outer sides of the drums 362A, 364A. The torsion springs 366 are also anchored to the housing 310B in housing side wall cavities 310E.

FIG. 27 illustrates the finger 300 in four different operational states or poses in views (a), (b), (c) and (d). With reference to view (a), the inner tendon cable 356 is routed over the roller 368, across to and over the inner roller 362, and through the phalanxes and vertebrae as described above and is anchored in the distal phalanx 316. A proximal section 356D of the tendon cable 356 extends to the drive spool or other drive mechanism. Similarly, the outer tendon cable 358 extends over the roller 368, across to and over the outer roller 364, and through the phalanxes and vertebrae as described above and is anchored in the distal phalanx 316. A proximal section 358D of the tendon cable 358 extends to the drive spool or other drive mechanism.

View (a) of FIG. 27 illustrates the configuration assumed by the tensioning system 360 when the finger 300 is in its neutral position.

View (b) of FIG. 27 illustrates the position or configuration assumed by the tensioning system 360 when the finger 300 is subjected to a force tending to force the finger upward or open, or when the drive system is operated to close the finger 300 and the finger 300 is fully closed or otherwise encounters resistance.

View (c) of FIG. 27 illustrates the position or configuration assumed by the tensioning system 360 when the finger 300 is subjected to a force tending to force the finger 300 downward or closed, or when the drive system is operated to open the finger 300 and the finger 300 is fully open or otherwise encounters resistance.

View (d) of FIG. 27 illustrates the position or configuration assumed by the tensioning system 360 when the finger 300 is subjected to a lateral or sideward force.

In each of the views (a)-(d), the tensioning system 360 is shown with the extended tendon cable or cables 356, 358 in their overloaded positions; that is, in the position assumed when the force acting on the finger pulls the associated roller or rollers to its or their forward position(s). In this position, the associated drum 362A, 364A and roller 362, 364 operate effectively as a two-force member as described above so that the full tension on the tendon cable 356, 358 is transferred to the housing 310B.

The tensioning system 360 reduces the overall required volume of the mechanism by locating the drums 362A, 364A on either side of the central fixed roller 368 and locating the springs 366 inside the drums 362A, 364A.

Fingers according to some embodiments may include more or fewer phalanxes and vertebrae. In some embodiments, one or more of the knuckle joints is provided with three or more vertebrae arranged in series between the connected phalanxes. In some embodiments, at least one of the knuckle joints includes only a single vertebra. The fingers may include more or fewer than four phalanxes and three knuckle joints. As discussed above, using a greater number of vertebrae can enable larger joint angles, smaller gaps between adjacent vertebrae, and more gradual tendon paths.

According to further embodiments, the PCBs 180 of the sensor assemblies 172, 174, 176 may be replaced with alternative substrates bearing the trace patterns 184. In some embodiments, an electrically conductive ink is applied directly to the polymeric phalanx bodies 120 of the phalanxes 112-116. In some embodiments, the conductive ink is screen printed onto the bodies 120. In some embodiments, the conductive ink is 3D printed onto the bodies 120.

In some embodiments, the trace 184 is provided as a metal foil tape that is secured (e.g., by adhesive) directly to the phalanx. The foil tape may be die-cut, laser cut or otherwise shaped in the form of the trace pattern 184.

In some embodiments, the trace pattern 184 is provided on a flex circuit that is secured to the phalanx. The flex circuit may include a flexible substrate formed of a polymeric material such as polymide, PEEK or polyester.

As discussed above, in some embodiments, the electrically conductive layer 186 is a semiconductor layer and, in particular, may be a flexible polymeric film or layer filled with electrically conductive particles. In other embodiments, the conductive layer 186 may instead be an electrically conductive metal foil that provides substantially an on/off response to applied pressure rather than a response that varies in proportion to the amount of the pressure.

In further embodiments, the electrically conductive layer 186 is omitted and the elastomeric cover member 148 (finger pad) is formed of an electrically conductive polymer. The conductive polymer may be a stock material or electrically conductive filler or additive material (e.g., particles) may be mixed into the molded or extruded cover member 148 during manufacture.

In further embodiments, the conductive layer 186 may be omitted and an electrically conductive or semiconductor layer may be applied directly to the inner surface of the cover member 148. The electrically conductive or semiconductor layer may be electroplated, sputter coated, metalized or sprayed onto the inner surface of a rubber/foam cover member 148, for example.

In further embodiments, the conductive layer 186 may be omitted and the sensor assembly may be modified to provide inductive or capacitive sensing of a metal filler (e.g., powder) or foil embedded in a compressible cover member 148 (finger pad). The sensor assembly may change its resistance responsive to and in proportion to the amount of compression of the cover member material in a direction generally orthogonal to the trace pattern.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:
1. A robotic end effector comprising:
   a finger extending from a proximal end to a distal end along a finger axis, the finger comprising:
      a first phalanx proximate the proximal end;
      a second phalanx proximate the distal end;

a knuckle joint including at least one vertebra interposed between and separating the first and second phalanxes, wherein:
the knuckle joint is configured to permit the second phalanx to pivot relative to the first phalanx about a pivot axis transverse to the finger axis; and
each vertebra has an axial thickness extending along the finger axis and a lateral width extending perpendicular to its axial thickness, and its lateral width is greater than its axial thickness;
at least one actuator to move the second phalanx relative to the first phalanx about the pivot axis; and
a tendon cable associated with the at least one actuator for moving the second phalanx relative to the first phalanx about the pivot axis;
wherein the tendon cable extends through the at least one vertebra and applies an axially compressive load to the first phalanx, the second phalanx and the at least one vertebra to hold the first phalanx, the second phalanx and the at least one vertebra together and in contact with one another.

2. The robotic end effector of claim 1 wherein each of the first and second phalanxes has a phalanx length that is at least 2 times the axial thickness of each of the vertebrae.

3. The robotic end effector of claim 1 wherein the lateral width of each of the vertebrae is at least 1.5 times its axial thickness.

4. The robotic end effector of claim 1 wherein each of the vertebrae has a height perpendicular to each of its axial thickness and its lateral width, and the axial thickness of the vertebra varies across the height of the vertebra.

5. The robotic end effector of claim 1 wherein at least one of the vertebrae includes a nonplanar bearing surface that engages an adjacent bearing surface of one of the first phalanx, the second phalanx, and an adjacent vertebra.

6. The robotic end effector of claim 5 wherein the bearing surface has at least one substantially planar section.

7. The robotic end effector of claim 5 wherein the bearing surface includes:
an outer stop face configured to limit rotation of the first phalanx about the pivot axis in a first bending direction; and
an angled inner face disposed at an oblique angle to the outer stop face to permit rotation of the first phalanx about the pivot axis in a second bending direction opposite the first bending direction.

8. The robotic end effector of claim 7 wherein the bearing surface further includes a neutral face located between the outer stop face and the inner angled face and disposed at an oblique angle to the outer stop face and the angled inner face.

9. The robotic end effector of claim 1 wherein the at least one vertebra includes a plurality of vertebrae serially arranged between the first phalanx and second phalanxes.

10. The robotic end effector of claim 9 wherein the at least one vertebra includes at least three vertebrae serially arranged between the first phalanx and second phalanxes.

11. The robotic end effector of claim 9 wherein each of the plurality of vertebrae includes a nonplanar bearing surface that engages an adjacent bearing face of one of the first phalanx, the second phalanx, and an adjacent vertebra.

12. The robotic end effector of claim 9 wherein at least two of the vertebrae have different axial thicknesses from one another.

13. The robotic end effector of claim 1 including:
a third phalanx proximate the distal end of the finger;
a second knuckle joint including at least one vertebra interposed between and separating the second and third phalanxes, wherein:
the second knuckle joint is configured to permit the third phalanx to pivot relative to the second phalanx about a second pivot axis transverse to the finger axis; and
each vertebra of the second knuckle joint has an axial thickness and a lateral width extending perpendicular to its axial thickness, and its lateral width is greater than its axial thickness; and
wherein the at least one actuator is operable to move the third phalanx relative to the second phalanx about the second pivot axis.

14. The robotic end effector of claim 1 including an elongate, flexible guide member extending from the first phalanx to the second phalanx and through the at least one vertebra to flexibly couple the first and second phalanxes and the at least one vertebra and retain the at least one vertebra between the first and second phalanxes.

15. The robotic end effector of claim 14 wherein the guide member has a Young's modulus of less than about 2.4 GPa at 23 degrees Celsius.

16. The robotic end effector of claim 1 including a tensioning mechanism to maintain the axially compressive load.

17. The robotic end effector of claim 1 wherein the tensioning mechanism includes a spring applying a biasing load to the tendon cable.

18. The robotic end effector of claim 1 including:
first and second tactile sensors mounted on the first and second phalanxes, respectively;
wherein the at least one vertebra does not or do not include tactile sensors mounted thereon.

19. The robotic end effector of claim 18 including electrical wires electrically connected to the second tactile sensor and extending from the second phalanx and through the at least one vertebra.

20. The robotic end effector of claim 1 wherein the at least one vertebra is or are formed of a polymeric material.

21. A robotic end effector comprising:
a finger extending from a proximal end to a distal end along a finger axis, the finger comprising:
a first phalanx proximate the proximal end;
a second phalanx proximate the distal end;
a knuckle joint including at least one vertebra interposed between and separating the first and second phalanxes, wherein:
the knuckle joint is configured to permit the second phalanx to pivot relative to the first phalanx about a pivot axis transverse to the finger axis; and
each vertebra has an axial thickness extending along the finger axis and a lateral width extending perpendicular to its axial thickness, and its lateral width is greater than its axial thickness;
a third phalanx proximate the distal end of the finger;
a second knuckle joint including at least one vertebra interposed between and separating the second and third phalanxes, wherein:
the second knuckle joint is configured to permit the third phalanx to pivot relative to the second phalanx about a second pivot axis transverse to the finger axis; and
each vertebra of the second knuckle joint has an axial thickness and a lateral width extending perpendicular to its axial thickness, and its lateral width is greater than its axial thickness; and at least one actuator to move the second phalanx relative to the first phalanx about the pivot axis, and to move the third phalanx relative to the second phalanx about the second pivot axis.

22. A robotic end effector comprising:
a finger extending from a proximal end to a distal end along a finger axis, the finger comprising:
 a first phalanx proximate the proximal end;
 a second phalanx proximate the distal end;
 a knuckle joint including at least one vertebra interposed between and separating the first and second phalanxes, wherein:
  the knuckle joint is configured to permit the second phalanx to pivot relative to the first phalanx about a pivot axis transverse to the finger axis; and
  each vertebra has an axial thickness extending along the finger axis and a lateral width extending perpendicular to its axial thickness, and its lateral width is greater than its axial thickness; and
 an elongate, flexible guide member extending from the first phalanx to the second phalanx and through the at least one vertebra to flexibly couple the first and second phalanxes and the at least one vertebra and retain the at least one vertebra between the first and second phalanxes; and
at least one actuator to move the second phalanx relative to the first phalanx about the pivot axis.

* * * * *

UNITED STATES PATENT AND TRADEMARK OFFICE
CERTIFICATE OF CORRECTION

PATENT NO. : 9,744,677 B2
APPLICATION NO. : 14/933443
DATED : August 29, 2017
INVENTOR(S) : Ohm et al.

Page 1 of 1

It is certified that error appears in the above-identified patent and that said Letters Patent is hereby corrected as shown below:

In the Specification

Column 11, Line 31: Please correct "The sensor 1760" to read -- The sensor 176D --

Column 13, Line 67: Please correct "The sensors 174A-1740" to read -- The sensors 174A-174D --

Column 19, Line 53: Please correct "part 1441" to read -- part 144I --

Column 24, Line 55: Please correct "four sensors 176A-1760" to read -- four sensors 176A-176D --

Signed and Sealed this
Twenty-first Day of August, 2018

Andrei Iancu
*Director of the United States Patent and Trademark Office*